US012174910B2

(12) United States Patent
Dikici et al.

(10) Patent No.: US 12,174,910 B2
(45) Date of Patent: *Dec. 24, 2024

(54) METHODS AND SYSTEMS FOR IMPLEMENTING A CONVOLUTION TRANSPOSE LAYER OF A NEURAL NETWORK

(71) Applicant: Imagination Technologies Limited, Kings Langley (GB)

(72) Inventors: Cagatay Dikici, London (GB); Clifford Gibson, Wheathampstead (GB); James Imber, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/425,726

(22) Filed: Jan. 29, 2024

(65) Prior Publication Data

US 2024/0169017 A1    May 23, 2024

Related U.S. Application Data

(63) Continuation of application No. 18/096,521, filed on Jan. 12, 2023, now Pat. No. 11,886,536, which is a (Continued)

(30) Foreign Application Priority Data

Mar. 20, 2019   (GB) .................................... 1903849

(51) Int. Cl.
G06F 17/15    (2006.01)
G06N 3/063    (2023.01)

(52) U.S. Cl.
CPC ........... *G06F 17/153* (2013.01); *G06N 3/063* (2013.01)

(58) Field of Classification Search
CPC ............ G06N 3/04; G06N 3/063; G06F 7/78
See application file for complete search history.

(56) References Cited

U.S. PATENT DOCUMENTS 9,600,763 B1    3/2017  Kasagi
2016/0358069 A1   12/2016  Brothers et al.
(Continued)

FOREIGN PATENT DOCUMENTS

EP    3330898 A1   6/2018
GB    2596239 A    12/2021
GB    2596239 B    12/2021

OTHER PUBLICATIONS

Bryant, "Pipelined Implementation," Part 1, CS App Ch. 4, Computer Architecture, 2018.

(Continued)

*Primary Examiner* — Emily E Larocque
(74) *Attorney, Agent, or Firm* — Potomac Law Group, PLLC; Vincent M DeLuca

(57) ABSTRACT

Methods and systems for performing a convolution transpose operation between an input tensor having a plurality of input elements and a filter comprising a plurality of filter weights. The method includes: dividing the filter into a plurality of sub-filters; performing, using hardware logic, a convolution operation between the input tensor and each of the plurality of sub-filters to generate a plurality of sub-output tensors, each sub-output tensor comprising a plurality of output elements; and interleaving, using hardware logic, the output elements of the plurality of sub-output tensors to form a final output tensor for the convolution transpose.

20 Claims, 27 Drawing Sheets

Related U.S. Application Data continuation of application No. 16/824,784, filed on Mar. 20, 2020, now Pat. No. 11,556,613.

(56) References Cited

U.S. PATENT DOCUMENTS

| | | |
|---|---|---|
| 2018/0032857 A1 | 2/2018 | Lele et al. |
| 2019/0138898 A1 | 5/2019 | Song et al. |
| 2019/0340498 A1 | 11/2019 | Mills |
| 2020/0110986 A1 | 4/2020 | Michiels et al. |

OTHER PUBLICATIONS

Patterson et al., Computer Organization and Design: The Hardware/Software Interface, Elsevier Science & Technology, Ch. 1, 2007.

Hennessy et al., "Computer Architecture: A Quantitative Approach," Elsevier Science & Technology, pp. 92-94, 2014.

FIG. 21

SINGLE HARDWARE PASS

MULTIPLE HARDWARE PASSES

METHODS AND SYSTEMS FOR IMPLEMENTING A CONVOLUTION TRANSPOSE LAYER OF A NEURAL NETWORK

CROSS-REFERENCE TO RELATED APPLICATIONS AND CLAIM OF PRIORITY

This application is a continuation under 35 U.S.C. 120 of application Ser. No. 18/096,521 filed Jan. 12, 2023, now U.S. Pat. No. 11,886,536, which is a continuation of prior application Ser. No. 16/824,784 filed Mar. 20, 2020, now U.S. Pat. No. 11,556,613, which claims foreign priority under 35 U.S.C. 119 from United Kingdom Application No. 1903849.6 filed Mar. 20, 2019, the contents of which are incorporated by reference herein in their entirety.

BACKGROUND

A Deep Neural Network (DNN) is a form of artificial neural network comprising a plurality of linked layers that enable the DNN to perform signal processing tasks, including, but not limited to, computer vision tasks. Each layer receives input data, processes the input data in accordance with the layer to produce output data, which is provided to the next layer as the input data or is output as the final output of the DNN. Accordingly, the first layer receives the original input data to the DNN (e.g. an image) as the input data. All other layers receive the output data from a previous layer (which may also be referred to as intermediate data) as the input data.

The processing that is performed on the input data of a layer is based on the type of layer. For example, each layer of a DNN may be one of a plurality of different types. Example DNN layer types include, but are not limited to, a convolution layer, an activation layer, a normalisation layer, a pooling layer and a convolution transpose layer. It will be evident to a person of skill in the art that these are example DNN layer types and that this is not an exhaustive list and there may be other DNN layer types.

For a convolution layer the input data is processed by convolving the input data with weights associated with that layer. Specifically, as shown in FIG. 1, the input data A to a convolution layer is typically arranged as a tensor of P planes p of input elements (which may be referred to as neurons or activations), where each plane p has a dimension X×Y. Each plane may be referred to as an input channel. A convolution layer is associated with one or more trainable filters or kernels W formed by a plurality of weights $w_0 \ldots w_n$. Each filter $W_i$ has a dimension m×n×P and is convolved with the input tensor A by sliding the filter W across the input tensor in the x and y directions at steps s and t respectively, as illustrated in FIG. 1. The size of the steps in a particular direction is referred to as the stride in that direction. At each step, the dot product of the input elements and filter weights is calculated to produce an output element (which may be referred to as an output neuron). The input elements that are applied to the filter weights at any step are referred to as a window of the input tensor A. Each filter $W_i$ thus produces an output plane B (i.e. a two-dimensional set of output elements or output neurons, which may be referred to as an activation map or an output channel) of the output. For example, a convolution layer with 12 filters W will produce an output comprising 12 planes.

Generally, a convolution operation produces an output tensor B that is smaller, in the x and/or y direction, relative to the input tensor A. For example, as shown in FIG. 2 a 5×5 input tensor A 202 convolved with a 3×3 filter W 204 with a stride of 2 in the x and y directions will produce a 2×2 output tensor B 206.

FIG. 3 illustrates the output (i.e. output tensor B 306) of an example two dimensional (2D) convolution operation between a 5×5 input tensor A 302 and a 3×3 filter W 304 with a stride of 2 in the x and y directions. Each output element $b_{i,j}$ (where i represents the row and j represents the column in the output tensor) is equal to the dot product of the input elements a and filter weights w when the first filter weight $w_{1,1}$ is aligned with the input element $a_{2i-1,2j-1}$. For example the output element $b_{1,1}$ is equal to the dot product of the input elements a and filter weights w when the first filter weight $w_{1,1}$ is aligned with the first input element $a_{1,1}$. Specifically, the output element $b_{1,1}$ is equal to $a_{1,1}*w_{1,1}+a_{1,2}*w_{1,2}+a_{1,3}*w_{1,3}+a_{2,1}*w_{2,1}+a_{2,2}*w_{2,2}+a_{2,3}*w_{2,3}+a_{3,1}*w_{3,1}+a_{3,2}*w_{3,2}+a_{3,3}*w_{3,3}$ which is equal to 6 in this example. Similarly, the output element $b_{2,2}$ is equal to the dot product of the input elements a and filter weights w when the first filter weight $w_{1,1}$ is aligned with the input element $a_{3,3}$. Specifically, the output element $b_{2,2}$ is equal to $a_{3,3}*w_{1,1}+a_{3,4}*w_{1,2}+a_{3,5}*w_{1,3}+a_{4,3}*w_{2,1}+a_{4,4}*w_{2,2}+a_{4,5}*w_{2,3}+a_{5,3}*w_{3,1}+a_{5,4}*w_{3,2}+a_{5,5}*w_{3,3}$ which is equal to 8 in this example.

A convolution operation can typically be represented as a matrix multiplication between an input vector $X^V$ and a sparse matrix C as shown in equation (1) where the non-zero elements of the sparse matrix C are the weights w of the filter W. The input vector $X^V$ is the elements of the input tensor unrolled from left to right and top to bottom (and front to back if 3D). For example, the input vector $A^V$ 402 for the 5×5 input tensor A 202 of FIG. 2 is a flattened 25-dimensional vector as shown in FIG. 4. Similarly the output vector $B^V$ is the elements of the output tensor B unrolled. For example, the output vector $B^V$ 406 for the 2×2 output tensor B 206 of FIG. 2 is a flattened 4-dimensional vector as shown in FIG. 4. An example sparse matrix C 404 for the convolution example of FIG. 2 is also shown in FIG. 4.

$$B^V = A^V * C \qquad (1)$$

In contrast, a convolution transpose layer (which may also be referred to as a deconvolution layer, a transpose convolution layer, or a fractionally strided convolution layer) performs the reverse operations of a convolution. Specifically, in a convolution transpose layer the input tensor A is processed by transposing the sparse matrix C for the corresponding direct convolution to generate a transposed sparse matrix $C^T$ and performing a matrix multiplication between the input vector $A^V$ and the transposed sparse matrix $C^T$ as shown in equation (2).

$$B^V = A^V * C^T \qquad (2)$$

As is known to those of skill in the art, a matrix is transposed by converting the rows of the matrix into columns and converting the columns into rows. For example, FIG. 6 illustrates the transposed sparse matrix $C^T$ 604 of the sparse matrix C 404 of FIG. 4. It can be seen that the first row of the sparse matrix C 404 of FIG. 4 has become the first column of the transposed sparse matrix $C^T$ 604 of FIG. 6, the second row of the sparse matrix C 404 of FIG. 4 has become the second column of the transposed sparse matrix $C^T$ 604 of FIG. 6 and so on. FIG. 6 also shows the output vector $B^V$ 606 and the input vector $A^V$ 602.

Where a convolution operation generally produces an output tensor B that is smaller, in the x and/or y direction, relative to the input tensor A, a convolution transpose operation generally produces an output tensor B that is larger, in the x and/or y direction, relative to the input tensor A. For example, as shown in FIG. 5 a convolution transpose operation between a 2×2 input tensor A 502 and a 3×3 filter W 504 with a stride of 2 in the x and y directions, produces a 5×5 output tensor B 506. Accordingly, a convolution transpose layer is often used in a neural network to perform up-sampling. However, a convolution transpose layer may also, or alternatively, be used in a neural network to perform image segmentation, image super-resolution, and/or objection detection.

A convolution transpose operation is equivalent to padding the input tensor A with (i) zeros between each element so that the input elements are spaced apart by the stride in the x and y directions (ii) filter_width−1 columns of zeros on the left and right edges; and (iii) filter_height−1 rows of zeros on the top and bottom edges; and convolving the padded input tensor $A^P$ with a reflected version of the filter $W^R$. An example of the convolution transpose of FIGS. 5 and 6 implemented as a direct convolution is shown in FIGS. 7-8. Specifically, the 2×2 input tensor A is padded with (i) zeros between elements (since the stride is 2 in both the x and y directions one zero element is inserted between elements in the x direction and y direction so that the original input elements are 2 elements apart in both directions); (ii) two columns of zeros on the left and right edges since the filter width is 3; and (iii) two rows of zeros on the top and bottom edges to generate a 7×7 padded input tensor $A^P$.

A reflected version of the filter $W^R$ is also generated. As is known to those of the skill in the art, a reflected version of a matrix is generated by reversing the order of the columns and the rows. For example, the element in the last column of the last row of a matrix becomes the element in the first column of the first row of the reflected matrix. FIGS. 7-8 illustrate the reflected version $W^R$ 704 of the filter W 304 of FIG. 3. It can be seen in FIG. 7-8 that the weights that were in the first row of the filter W 304 of FIG. 3 are now in the last row of the reflected filter $W^R$ of FIGS. 7-8 and in the reverse order. Similarly, the weights that were in the last row of the filter W 304 of FIG. 3 are now in the first row of the reflected filter $W^R$ 704 of FIG. 7-8 and in the reverse order.

The output tensor B 706 is then generated by convolving the padded input tensor $A^P$ 702 with the reflected filter $W^R$ 704. Specifically, in the example of FIGS. 7-8 each output element $b_{i,j}$ (where i represents the column and j the row) is equal to the dot product of the elements of the padded input tensor $A^P$ and the weights of the reflected filter $W^R$ when the first weight $w_{1,1}$ of the reflected filter $W^R$ is aligned with element $a_{i,j}^P$ of the padded input tensor $A^P$. FIG. 7 illustrates the calculation of output element $b_{1,1}$ and FIG. 8 illustrates the calculation of the output element $b_{3,3}$.

A convolution transpose layer is typically implemented by transposing the convolution filter(s); performing matrix multiplications between the transposed convolution filter(s) and each element of the input tensor; and summing the results of the matrix multiplications to calculate the final output elements. For example, the convolution transpose of FIG. 3 is typically implemented by (i) multiplying the first input element $a_{1,1}$ by each of the weights $w_{i,j}$ of the transposed filter $W^T$, (ii) multiplying the second input element $a_{1,2}$ by each of the weights $w_{i,j}$ of the transposed filter, etc. and then combining the results of the multiplications to generate the output elements. For example, the output element $b_{1,3}$ is calculated as the sum of $a_{1,1}*w_{1,3}$ and $a_{1,2}*w_{1,1}$.

The problem with implementing a convolution transpose operation in this manner is that it cannot be performed efficiently in hardware, especially in hardware, such as a neural network accelerator, designed to implement a neural network. This is because implementing a convolution transpose operation in this manner requires the calculation of intermediate results in a first step and accumulation of the intermediate results in a second step. Accordingly, it is desirable to be able to perform a convolution transpose operation in a more hardware efficient manner.

The embodiments described below are provided by way of example only and are not limiting of implementations which solve any or all of the disadvantages of known methods and systems for implementing a convolution transpose operation.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for performing a convolution transpose operation between an input tensor comprising a plurality of input elements and a filter comprising a plurality of filter weights. The method includes: dividing the filter into a plurality of sub-filters; performing, using hardware logic, a convolution operation between the input tensor and each of the plurality of sub-filters to generate a plurality of sub-output tensors, each sub-output tensor comprising a plurality of output elements; and interleaving, using hardware logic, the output elements of the plurality of sub-output tensors to form a final output tensor for the convolution transpose.

A first aspect provides a method for performing a convolution transpose operation between an input tensor comprising a plurality of input elements and a filter comprising a plurality of filter weights, the method comprising: dividing the filter into a plurality of sub-filters; performing, using hardware logic, a convolution operation between the input tensor and each of the plurality of sub-filters to generate a plurality of sub-output tensors, each sub-output tensor comprising a plurality of output elements; and interleaving, using hardware logic, the output elements of the plurality of sub-output tensors to form a final output tensor for the convolution transpose.

A second aspect provides a system to perform a convolution transpose operation between an input tensor comprising a plurality of input elements and a filter comprising a plurality of filter weights, the system comprising: one or more convolution engines configured to perform a direct convolution between the input tensor and each of a plurality of sub-filters to generate a plurality of sub-output tensors comprising a plurality of output elements, each sub-filter comprising a subset of the filter weights of the filter; and an interleave engine configured to interleave the output elements of the plurality of sub-output tensors to generate a final output tensor for the convolution transpose.

A third aspect provides a method of performing a convolution transpose operation on an integrated circuit, the convolution transpose operation being between an input tensor comprising a plurality of input elements and a filter comprising a plurality of filter weights, the method comprising: dividing the filter into a plurality of sub-filters; performing, using one or more convolution engines of the integrated circuit, a convolution operation between the input tensor and each of the plurality of sub-filters to generate a plurality of sub-output tensors, each sub-output tensor comprising a plurality of output elements; and interleaving, using an interleave engine of the integrated circuit, the output elements of the plurality of sub-output tensors to form a final output tensor for the convolution transpose.

The system for performing a convolution transpose as described herein may be embodied in hardware on an integrated circuit. There may be provided a method of manufacturing, at an integrated circuit manufacturing system, the system for performing a convolution transpose as described herein. There may be provided an integrated circuit definition dataset that, when processed in an integrated circuit manufacturing system, configures the system to manufacture the system for performing a convolution transpose as described herein. There may be provided a non-transitory computer readable storage medium having stored thereon a computer readable description of a system for performing a convolution transpose as described herein that, when processed in an integrated circuit manufacturing system, causes the integrated circuit manufacturing system to manufacture an integrated circuit embodying a system for performing a convolution transpose.

There may be provided an integrated circuit manufacturing system comprising: a non-transitory computer readable storage medium having stored thereon a computer readable description of the system for performing a convolution transpose as described herein; a layout processing system configured to process the computer readable description so as to generate a circuit layout description of an integrated circuit embodying the system for performing a convolution transpose; and an integrated circuit generation system configured to manufacture the system for performing a convolution transpose according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 21 is a schematic diagram illustrating the interleaving of the sub-output tensors of the transpose convolution of FIGS. 14-18;

Figure 1:
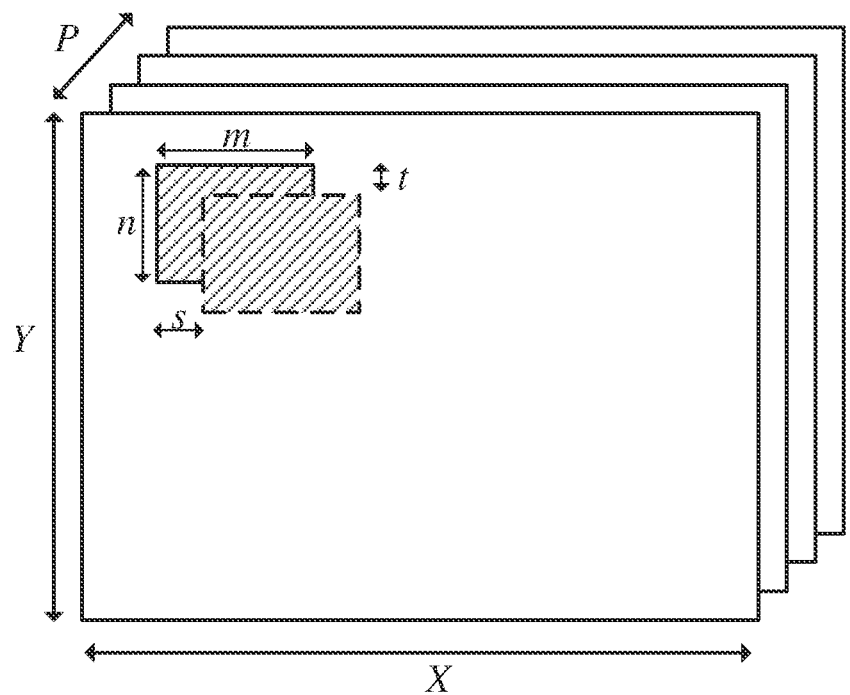
FIG. 1 is a block diagram of example data in a convolution operation.
Figure 2:
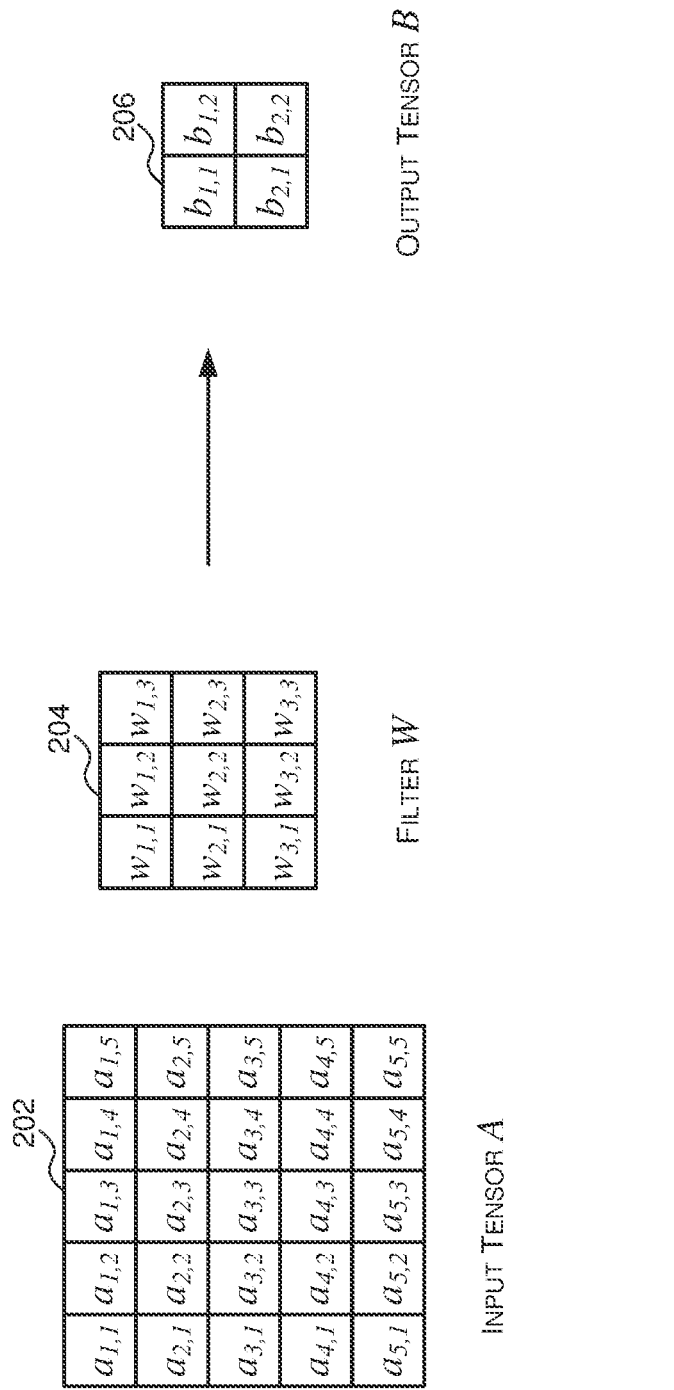
FIG. 2 is a schematic diagram of a first example convolution between an input tensor A and a filter W.
Figure 3:
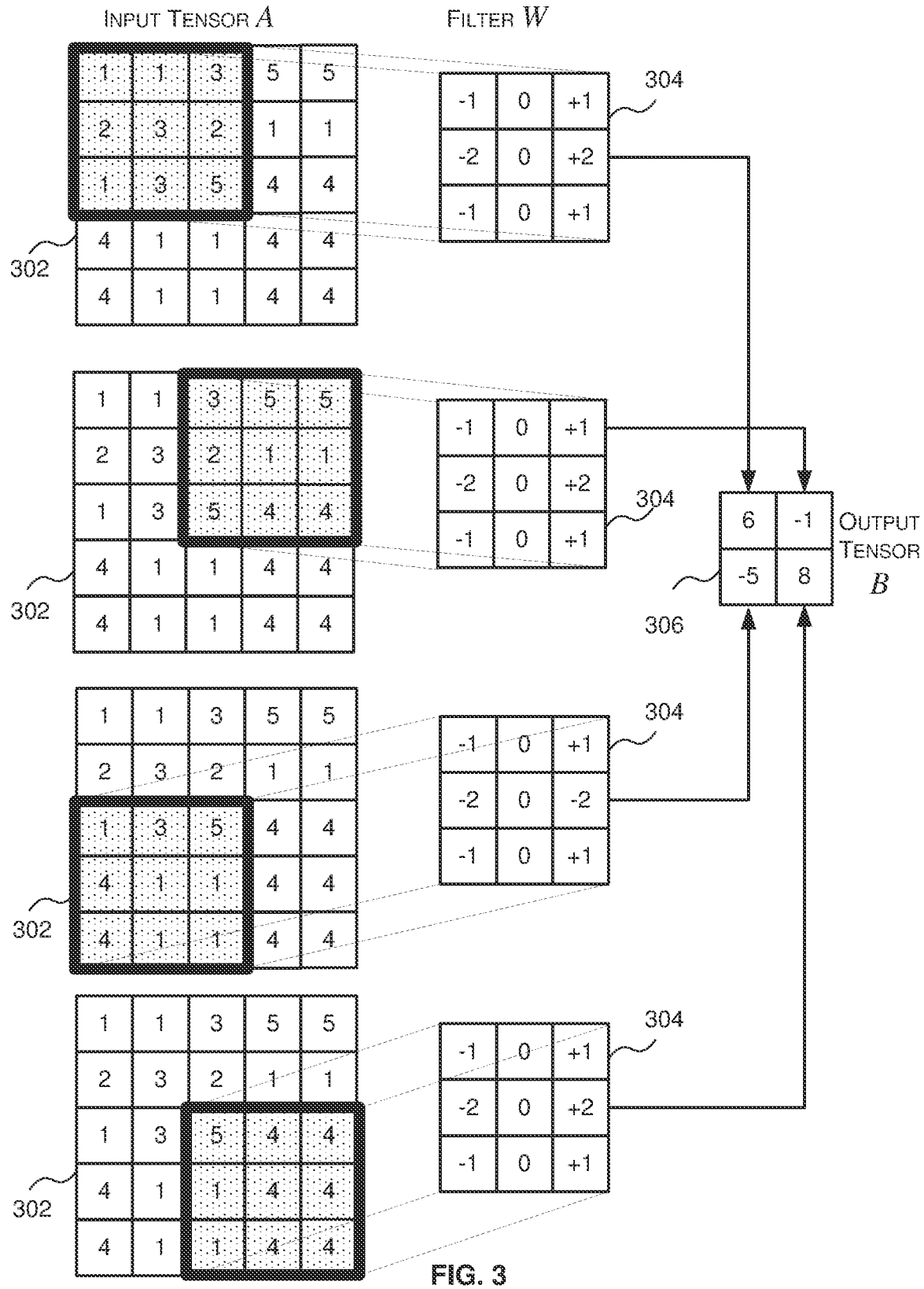
FIG. 3 is a schematic diagram illustrating the generation of the output tensor B for an example implementation of the convolution of FIG. 2.
Figure 4:
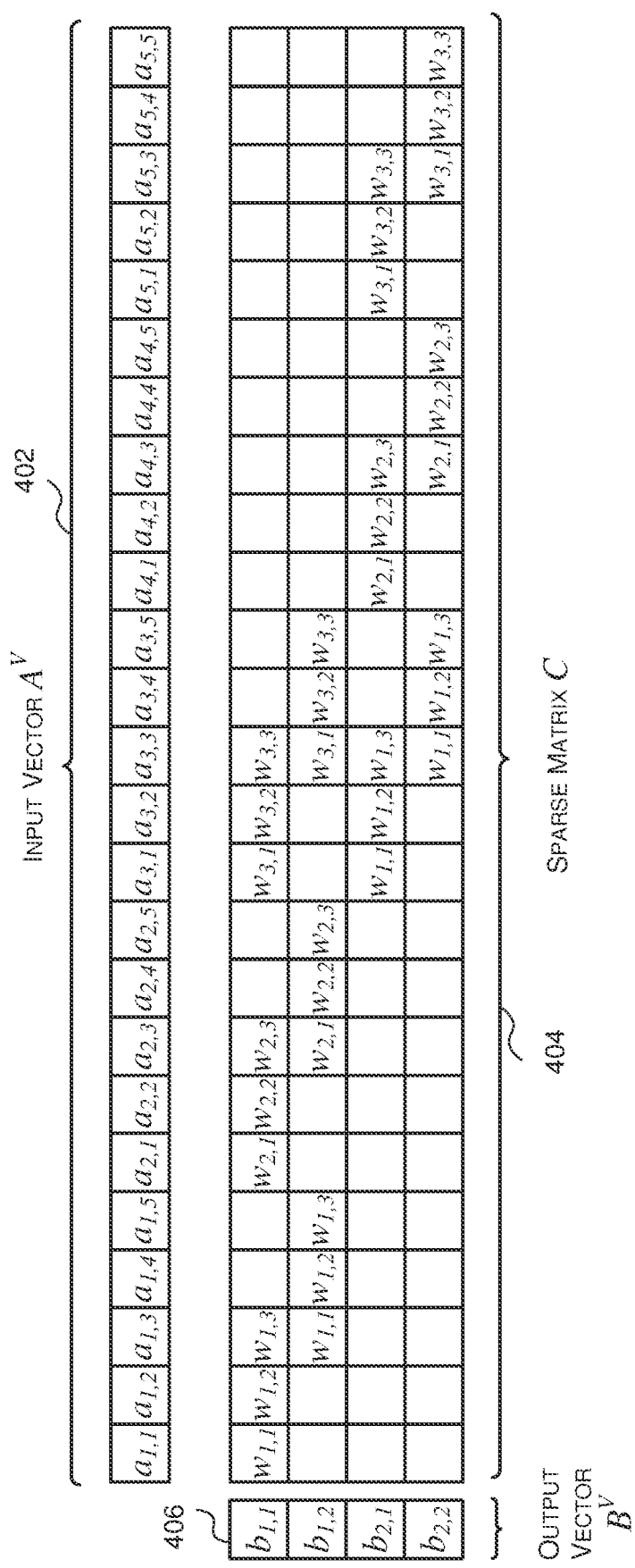
FIG. 4 is a schematic diagram illustrating the convolution of FIG. 2 as a vector-matrix multiplication.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, is not efficient to implement a convolution transpose operation by calculating the transpose of the filter, performing a matrix multiplication between the transposed filter and the inputs; and summing the outputs of the matrix multiplication to generate the convolution transpose elements.

Accordingly, described herein are methods and systems for implementing a convolution transpose operation by performing a plurality of direct convolutions on the input to the convolution transpose and interleaving the outputs of the direct convolutions to generate the output of the convolution transpose. Specifically, in the methods and systems described herein the filter is divided into a plurality of sub-filters; a convolution operation is performed between each sub-filter and the input tensor to generate a sub-output tensor; and the elements of the sub-output tensors are interleaved to generate the final output. Implementing a convolution transpose operation in this manner allows a convolution transpose operation to be implemented efficiently in hardware. This is because when a convolution transpose operation is implemented in this manner there are no intermediate results that have to be stored and accumulated. Furthermore, when the convolution transpose is to be performed as part of a DNN (i.e. the DNN comprises a convolution transpose layer) implementing the convolution transpose in this manner allows the convolution transpose to be performed using hardware designed perform a convolution (i.e. hardware used to implement a convolution layer) which, due to the popularity and importance of convolution layers in DNNs, a hardware implementation of a DNN (such as a DNN accelerator) is likely to already comprise.

The method, which will be described in more detail below, will be briefly described using FIGS. 9-12 which illustrate an example one dimensional (1D) convolution between a 10-element input tensor A 902 and a 3-weight filter W and the corresponding convolution transpose.

Figure 9:
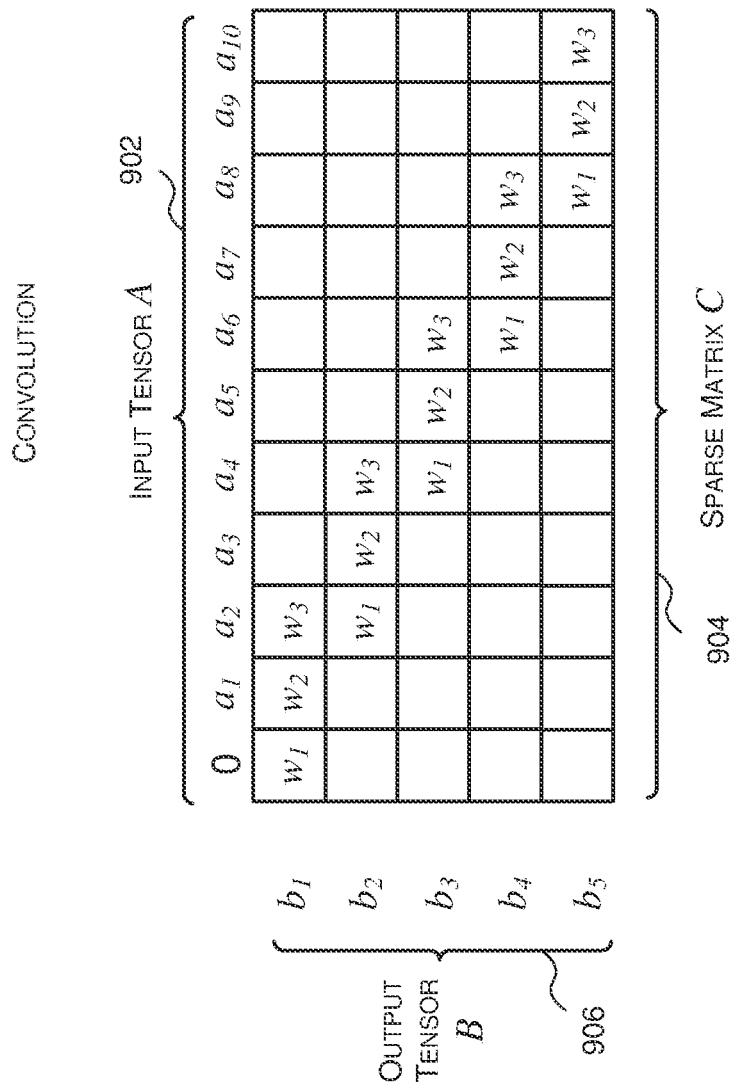
FIG. 9 is a schematic diagram illustrating an example one-dimensional convolution between an input tensor and a filter in vector-matrix format.

Specifically, FIG. 9 illustrates a 1D convolution between a 10-element input tensor A=[0 $a_1$ $a_2$ $a_3$ $a_4$ $a_5$ $a_6$ $a_7$ $a_8$ $a_9$ $a_{10}$] 902 with a leading padding zero and a 3-weight filter W=[$w_1$ $w_2$ $w_3$] with a stride of 2 in the x direction that produces a 5-element output tensor B=[$b_1$ $b_2$ $b_3$ $b_4$ $b_5$] 906. The output tensor is generated by sliding the filter W over the input tensor A 902 at two element increments and generating the dot product of the input elements and the weights at each position. Specifically, the $i^{th}$ output element $b_i$ is equal to the dot product of the input values and filter weights when the first filter weight $w_1$ is aligned with the $((i*stride)-1)^{th}$ input element. For example, the $1^{st}$ output element $b_1$ of the output tensor is equal to the dot product of the input elements and the filter weights when the $1^{st}$ filter weight $w_1$ is aligned with the $0^{th}$ input element; and the $2^{nd}$ output element $b_2$ is equal to the dot product of the input elements and the filter weights when the $1^{st}$ filter weight $w_1$ is aligned with the $2^{nd}$ input element $a_2$. As described above, such a convolution can be expressed as a matrix multiplication between the corresponding input vector A and a sparse matrix C 904.

Figure 8:
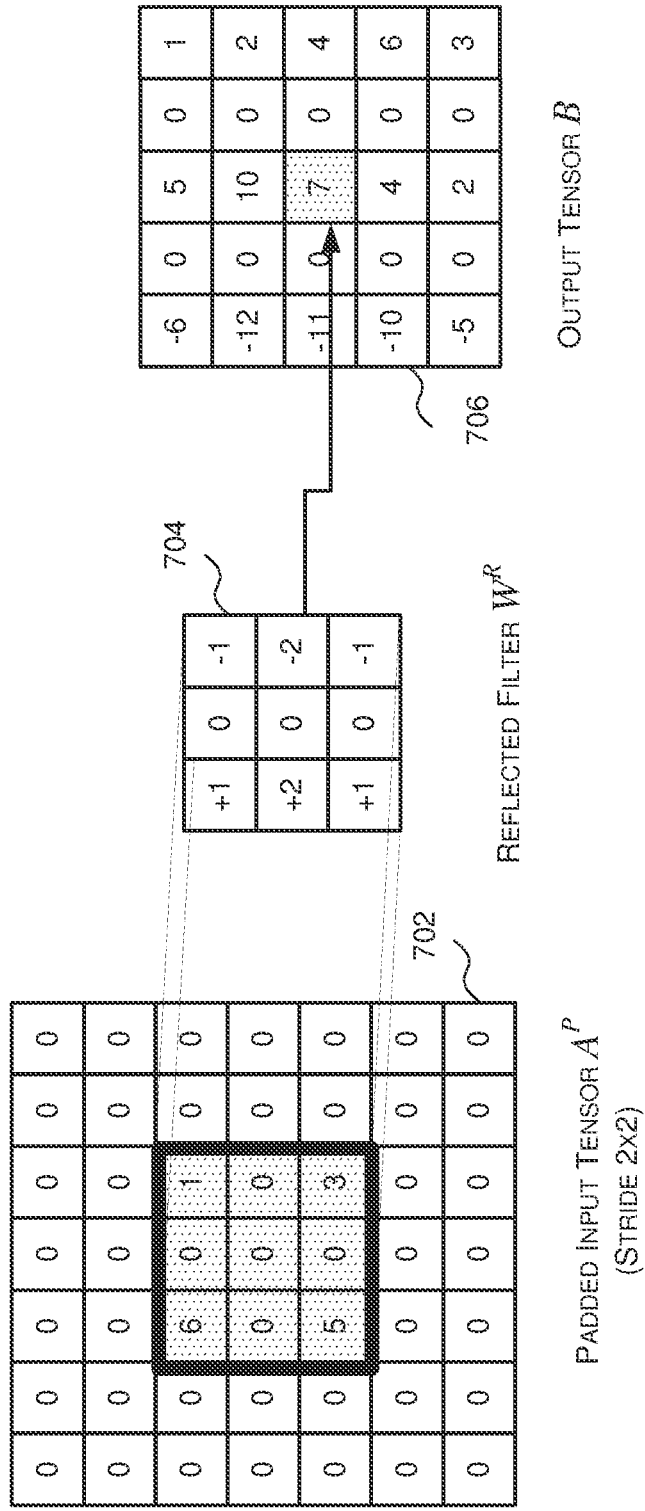
FIG. 8 is a schematic diagram illustrating the generation of a second output element of the output tensor for an example implementation of the convolution transpose of FIG. 5.
Figure 10:
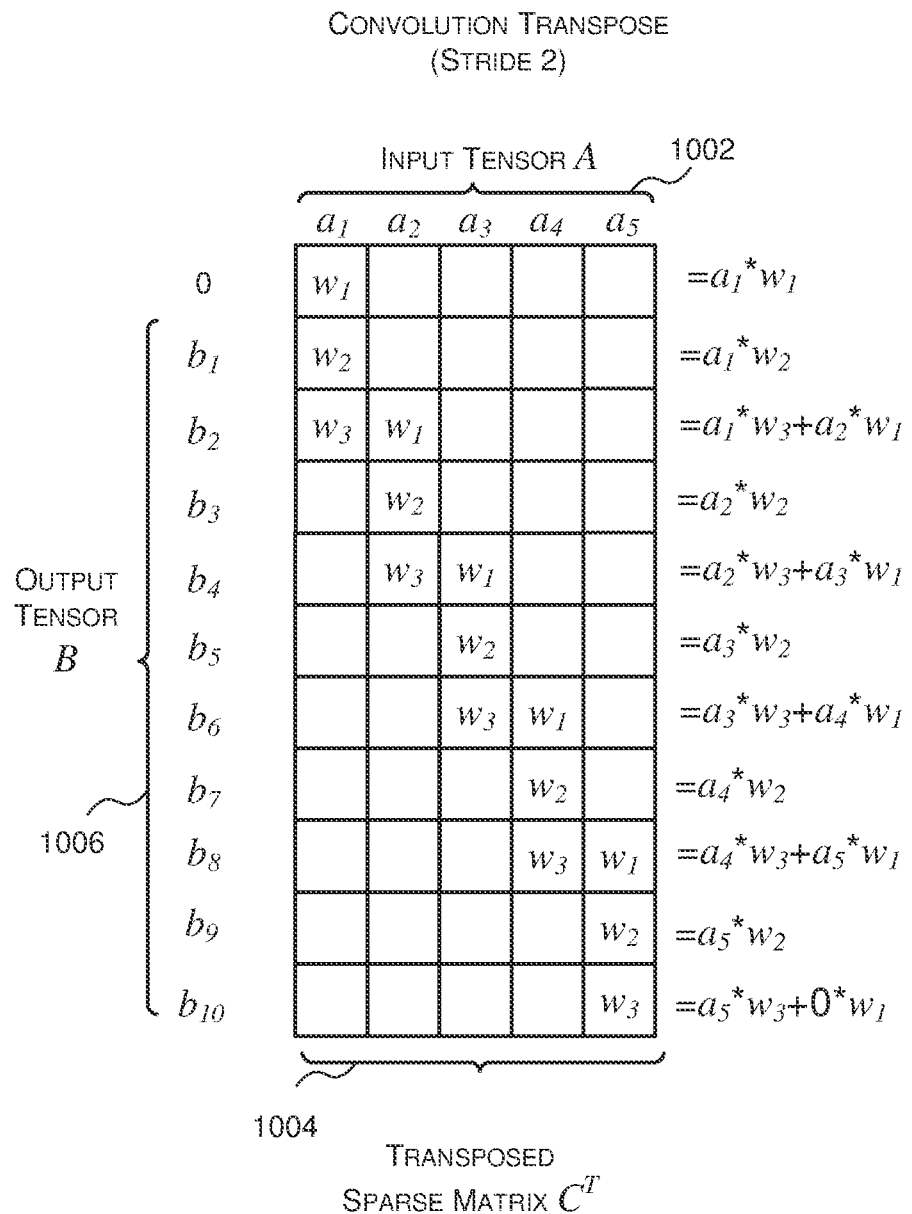
FIG. 10 is a schematic diagram illustrating an example one-dimensional convolution transpose between an input tensor and the filter of FIG. 9 in vector-matrix format.
Figure 11:
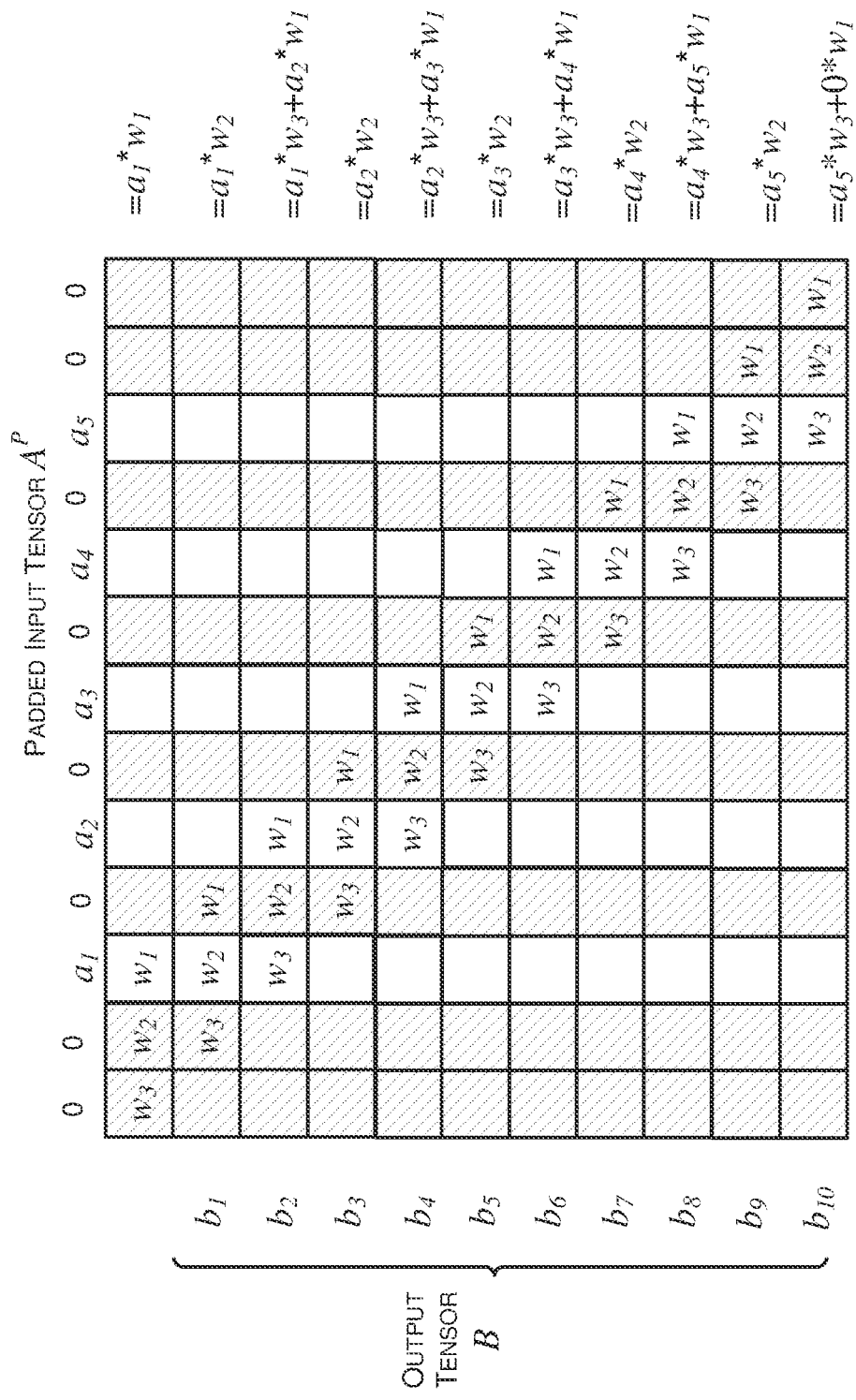
FIG. 11 is a schematic diagram illustrating the one-dimensional convolution transpose of FIG. 10 as a direct convolution of the reflected filter and a padded input tensor in vector-matrix format.

FIG. 10 illustrates the corresponding convolution transpose operation (i.e. a convolution transpose between a 5-element input tensor A=[$a_1$ $a_2$ $a_3$ $a_4$ $a_5$] 1002 and the 3-weight filter W=[$w_1$ $w_2$ $w_3$] of FIG. 9 that produces a 10-element output tensor B=[$b_1$ $b_2$ $b_3$ $b_4$ $b_5$ $b_6$ $b_7$ $b_8$ $b_9$ $b_{10}$] 1006. As described above, a convolution transpose operation can be expressed as a matrix multiplication between an input vector A and the transposed sparse matrix $C^T$ 1004. As is shown in FIG. 11 the convolution transpose operation is equivalent to padding the input tensor A with zeros between each element so that the input elements are spaced apart by the stride in the x and y directions and on one or more edges and convolving the padded input tensor $A^P$ with a reflected version of the filter $W^R$. As described above, a convolution transpose operation is typically implemented by transposing the filter W (i.e. generating $W^T$); performing matrix multiplications between the transposed filter and the input elements and generating the output elements by combining the results of the multiplications. For example, in FIG. 8 the output elements $b_i$ are typically generated by transposing the filter W (i.e. generating $W^T$) and multiplying the transposed filter $W^T$ with the elements of the input tensor. However, implementing a convolution transpose operation in this manner is not hardware efficient.

Accordingly, the inventors have identified that a convolution transpose operation may be implemented more efficiently in hardware by dividing the filter into a plurality of sub-filters; performing a direct convolution between the input tensor and each sub-filter to generate a plurality of sub-output tensors; and interleaving the elements of the sub-output tensors to generate the final output tensor.

Figure 12:
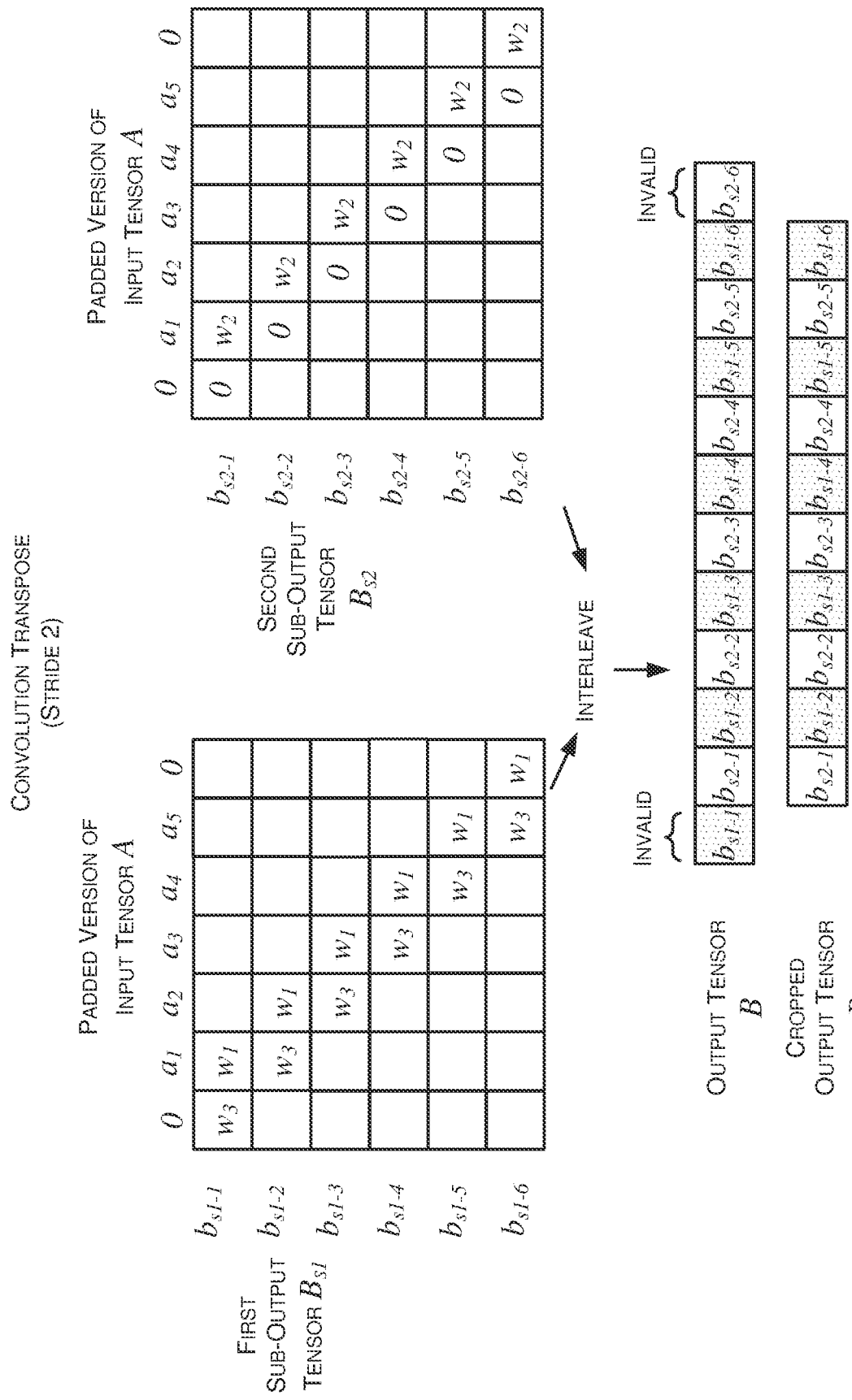
FIG. 12 is a schematic diagram illustrating the one-dimensional convolution transpose of FIG. 10 implemented as a plurality of direct convolutions.

For example, it can be seen in FIGS. 10 and 11 that each even output element is equal to the dot product of the $i^{th}$ and $(i+1)^{th}$ input elements and the third and first filter weights $w_3$ and $w_1$, wherein i=n/2 and n is the output element number. Accordingly, the even output elements can be generated by performing a direct convolution between the input tensor A and a first sub-filter $W_{s1}$=[$w_3$ $w_1$]. Similarly, each odd output element is equal to the product of the $i^{th}$ input element $a_i$ and the second filter weight $w_2$, wherein i=(n+1)/2 and n is the output element number. Accordingly the odd output elements can be generated by performing a direct convolution between the input tensor A and a second sub-filter $W_{s2}$=[0 $w_2$]. The final output tensor B of the convolution transpose can then be generated by interleaving the outputs of the first convolution and the second convolution as shown in FIG. 12. Specifically, the final output tensor B of the convolution transpose can be generated by alternating between the outputs of the first and second convolutions.

It will be evident to a person of skill in the art that this is an example only and that the same principles and techniques can be applied to any convolution transpose. Specifically, the Applicant submits that any convolution transpose operation can be divided into a plurality of direct convolutions the outputs of which can be interleaved to form the final convolution transpose output.

Figure 13:
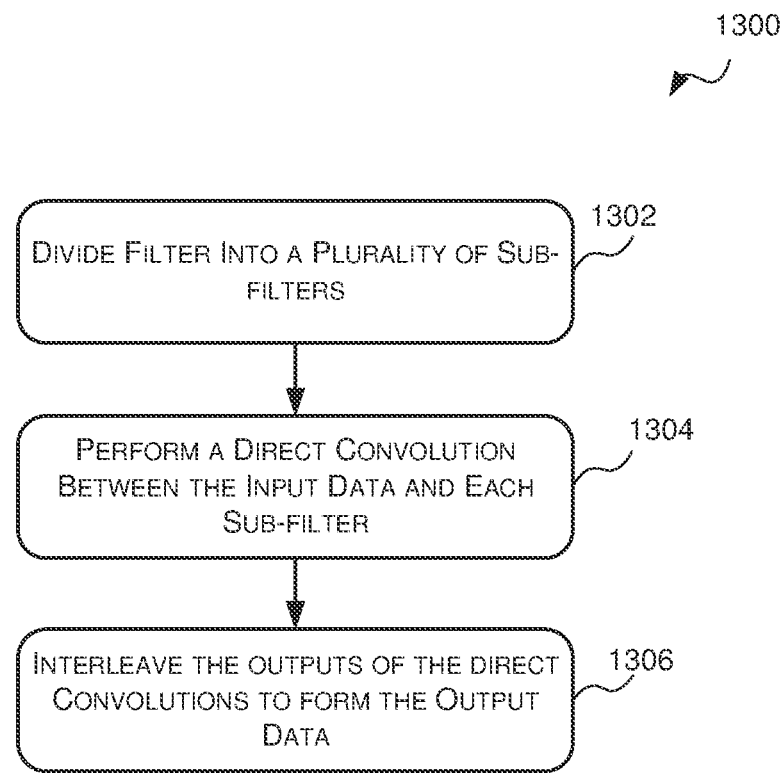
FIG. 13 is a flow diagram illustrating an example method for implementing a convolution transpose as a plurality of direct convolutions.

Reference is now made to FIG. 13 which illustrates an example method 1300 for performing a convolution transpose operation between an input tensor A comprising a plurality of input elements $a_i$ and a filter W comprising a plurality of filter weights $w_i$. The input tensor may be, for example, one-dimensional (e.g. a vector of input elements), or multi-dimensional (e.g. two dimensional (e.g. a matrix of input elements) or three-dimensional). Similarly the filter may also be one dimensional, or multi-dimensional (e.g. two dimensional or three dimensional). Typically the input tensor and the filter are of the same dimension, but in some cases, they may be of different dimensions.

The method 1300 begins at block 1302 where the filter W is divided into a plurality of sub-filters $W_{si}$. Dividing a filter W into a plurality of sub-filters $W_{si}$ comprises dividing the plurality of weights w of the filter W into a plurality of sub-filers $W_{si}$. Each sub-filter comprises a set of weights w that are applied together to a set of input elements to generate output elements of the convolution transpose. In some cases, the sub-filters are non-overlapping. In other words, in these cases each filter weight forms part of only one sub-filter.

Figure 14:
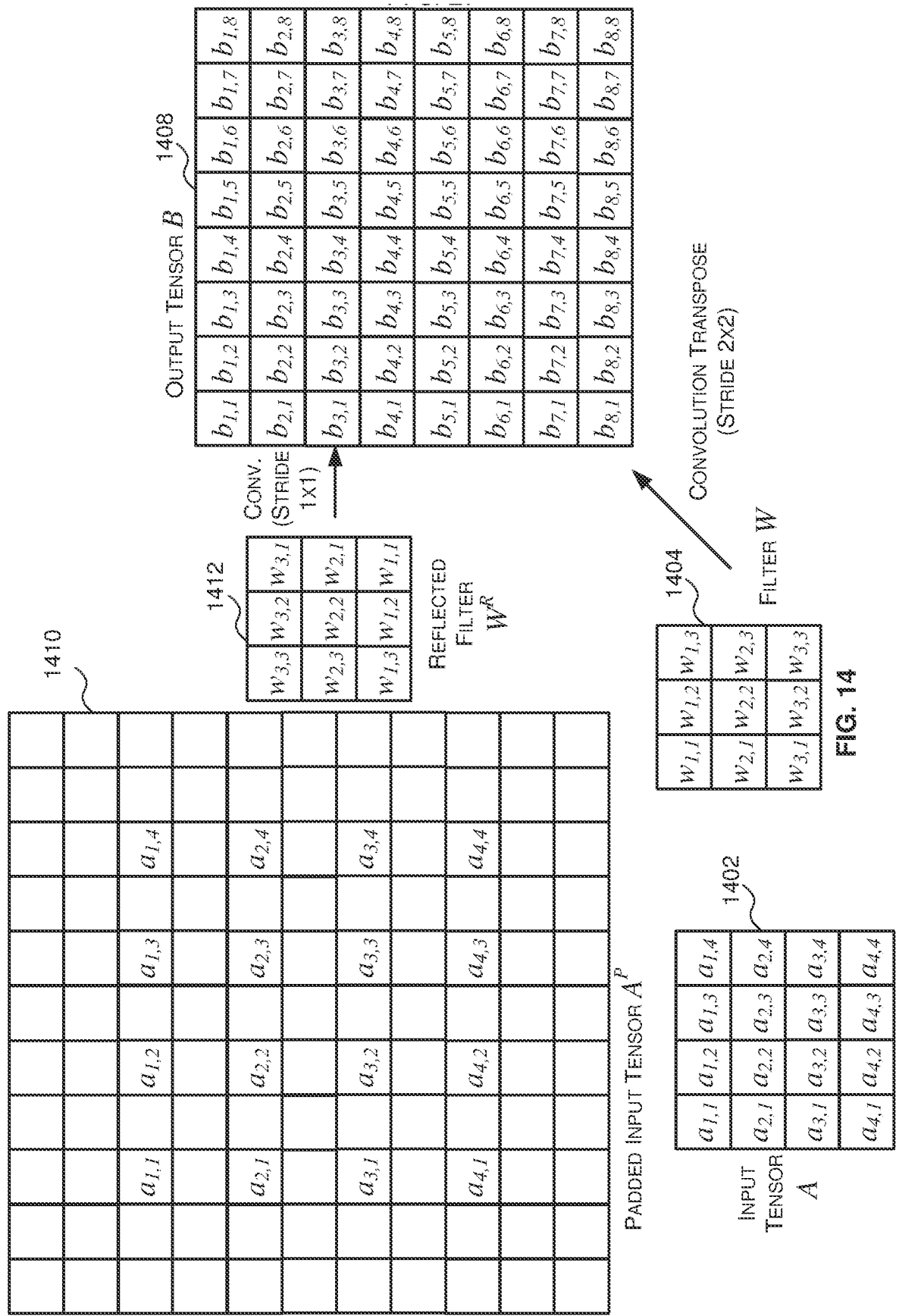
FIG. 14 is a schematic diagram illustrating a convolution transpose implemented in two ways.

As described above, a convolution transpose operation is equivalent to padding the input tensor A with zeros between each element so that the input elements are spaced apart by the stride in the x, y and z directions and on one or more edges and convolving the padded input data $A^P$ with a reflected version of the filter $W^R$. For example, as shown in FIG. 14, a convolution transpose between an input tensor A 1402 and filter W 1404 with stride_x=2 and stride_y=2 is equivalent to a convolution between padded input data $A^P$ 1410 (wherein the original input elements are spaced apart by two elements in the x and y directions) and the reflected filter $W^R$ with stride_x=1 and stride_y=1. Specifically both the convolution transpose and the direct convolution will produce the same output tensor B 1408. As shown in FIGS. 15-18 as the reflected filter $W^R$ 1412 is slid over the padded input tensor $A^P$ 1410 during the convolution only a subset of the filter weights w align with (or are applied to) the original input elements a at any position. Each subset of filter weights w that aligns with (or is applied to) the original input elements a at a filter position forms a sub-filter.

Figure 15:
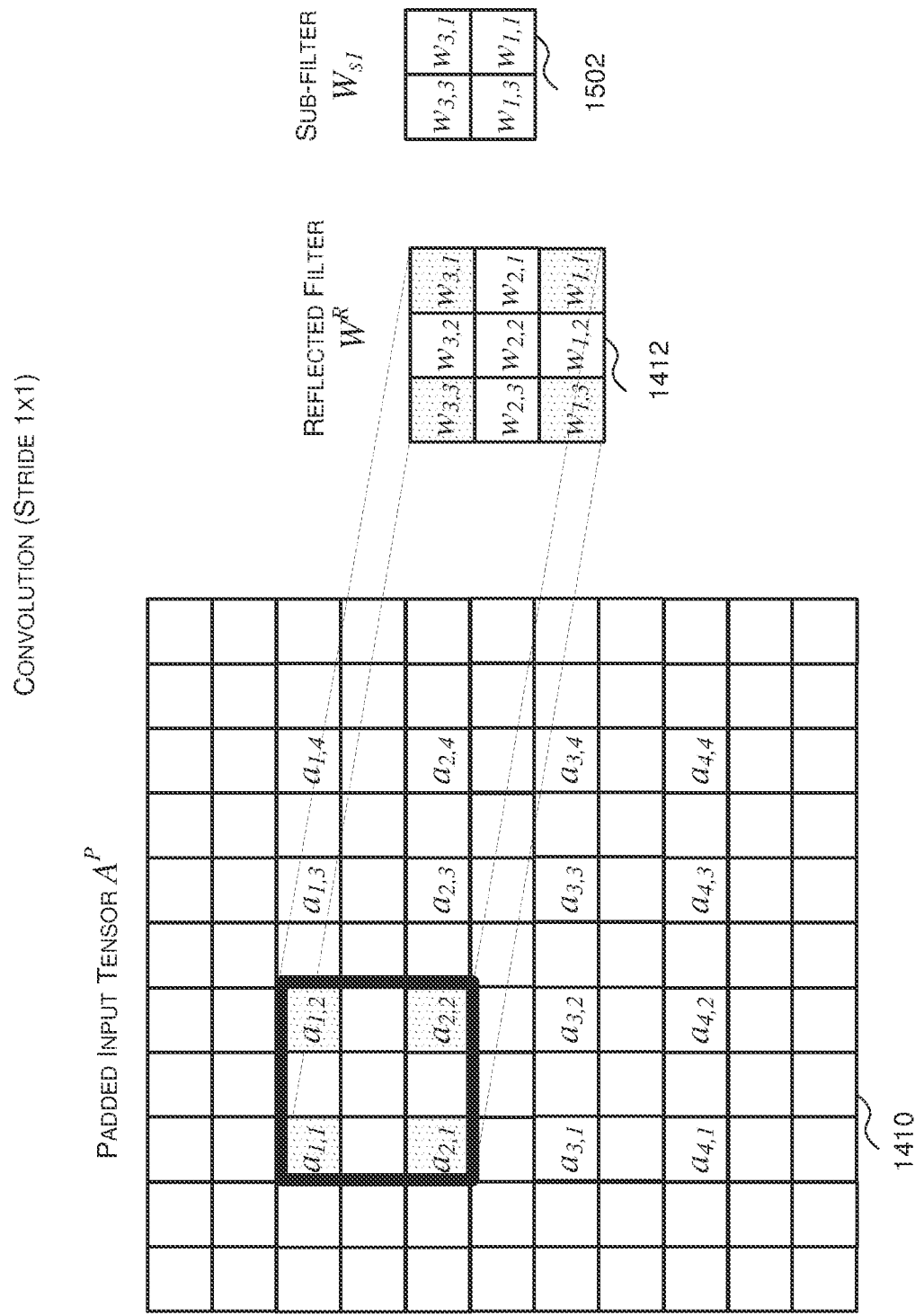
FIG. 15 is a schematic diagram illustrating a first sub-filter of the convolution transpose of FIG. 14.
Figure 16:
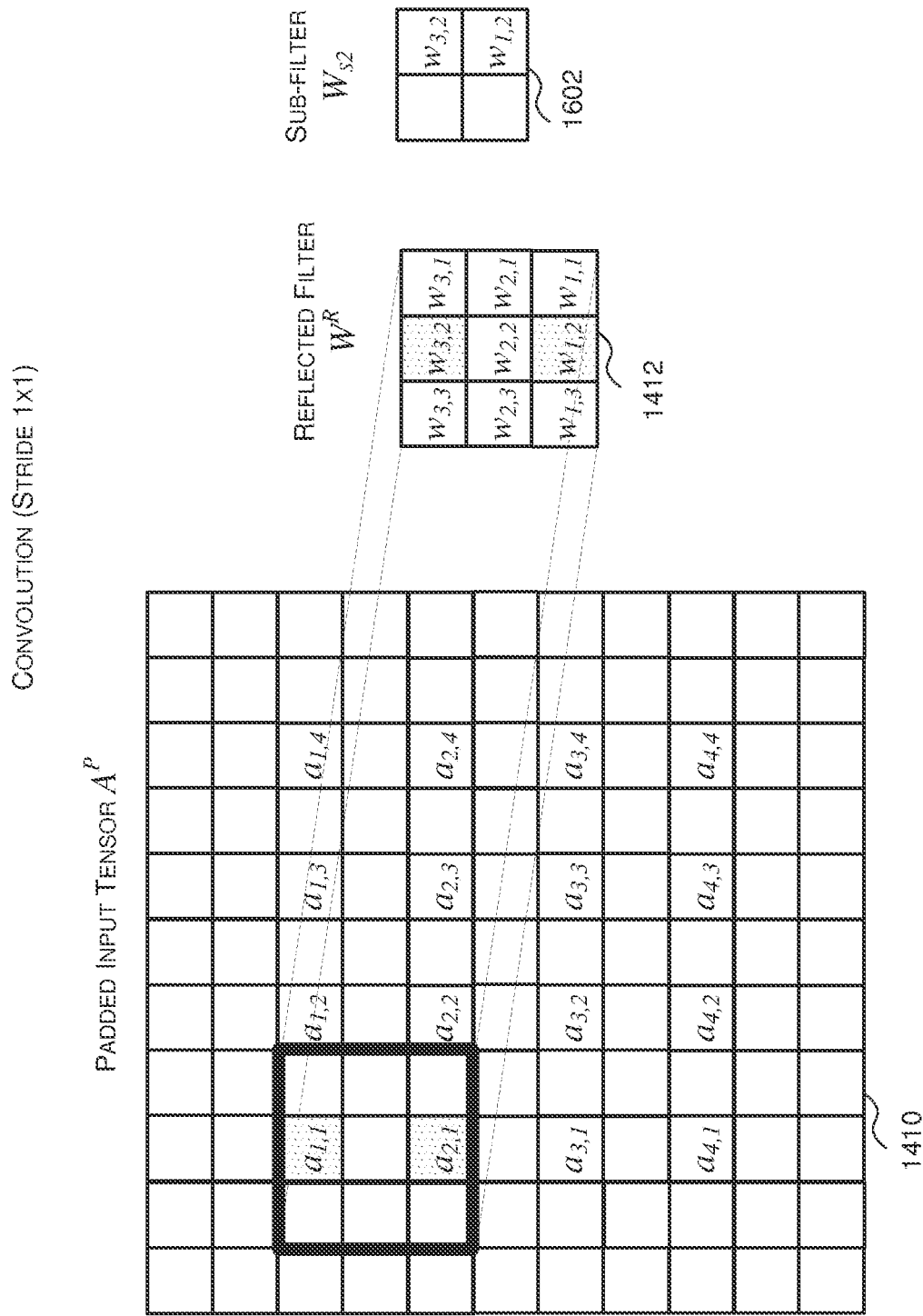
FIG. 16 is a schematic diagram illustrating a second sub-filter of the convolution transpose of FIG. 14.
Figure 17:
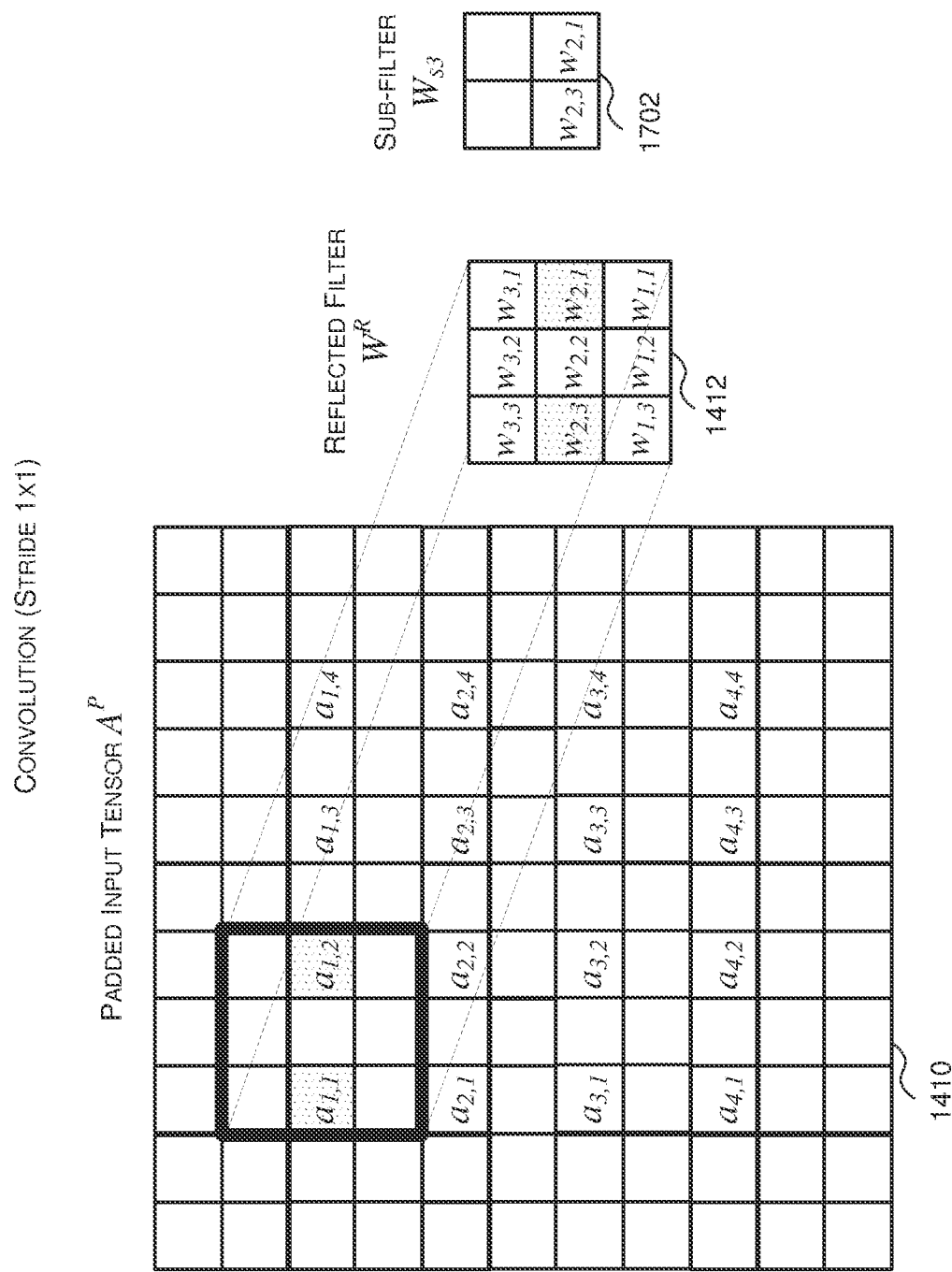
FIG. 17 is a schematic diagram illustrating a third sub-filter of the convolution transpose of FIG. 14.
Figure 18:
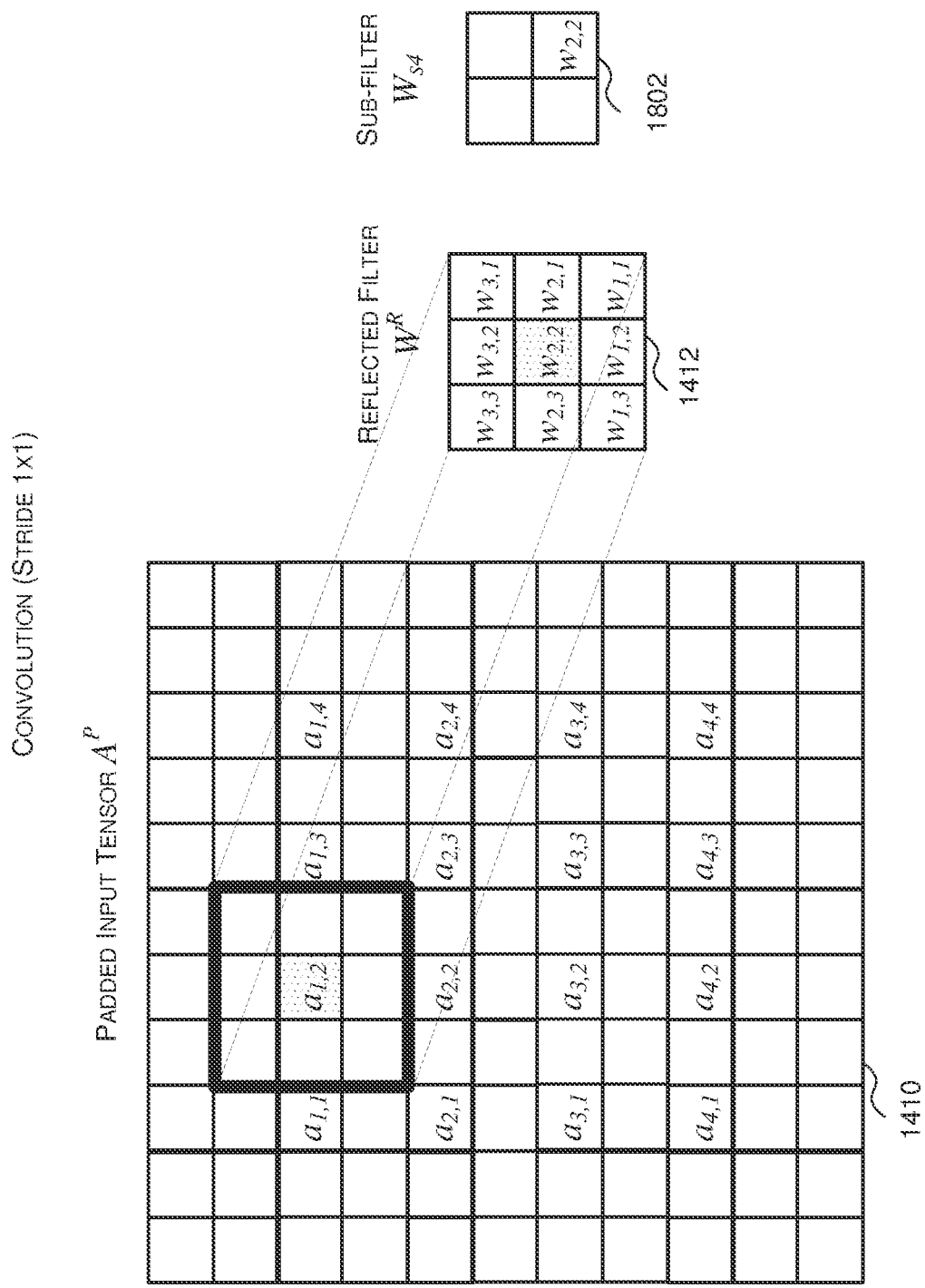
FIG. 18 is a schematic diagram illustrating a fourth sub-filter of the convolution transpose of FIG. 14.

For example, as shown in FIG. 15 when the first weight in the first row of the reflected filter $W^R$ 1412 is aligned with the third element in the third row of the padded input tensor $A^P$ 1410 only four filter weights $w_{3,3}$, $w_{3,1}$, $w_{1,3}$ and $w_{1,1}$ overlap or align with one of the original input elements. This results in a first sub-filter $W_{s1}$ 1502 formed of filter weights $w_{3,3}$, $w_{3,1}$, $w_{1,3}$ and $w_{1,1}$. Similarly, in FIG. 16 when the first weight in the first row of the reflected filter $W^R$ 1412 is aligned with the second element in the third row of the padded input tensor $A^P$ 1410 only two filter weights $w_{3,2}$ and $w_{1,2}$ overlap or align with an original input element. This results in a second sub-filter $W_{s2}$ 1602 formed of filter weights $w_{3,2}$ and $w_{1,2}$. In FIG. 17 when the first weight in the first row of the reflected filter $W^R$ 1412 is aligned with the third element in the second row of the padded input tensor $A^P$ 1410 only two filter weights $w_{2,3}$ and $w_{2,1}$ overlap or align with an original input element. This results in a third sub-filter $W_{s3}$ 1702 formed of filter weights $w_{2,3}$ and $w_{2,1}$. In FIG. 18 when the first weight in the first row of the reflected filter $W^R$ 1412 is aligned with the fourth element in the second row of the padded input tensor $A^P$ 1410 only one filter weight $w_{2,2}$ overlaps or aligns with an original input element. This results in a fourth sub-filter $W_{s4}$ 1802 formed of filter weight $w_{2,2}$. All the filter elements of the original filter W 1404 belong to one of the four sub-filters 1502, 1602, 1702, 1802 thus all of the sub-filters have been identified.

The number of sub-filters generated for a particular convolution transpose is based on the stride(s) of the convolution transpose. In particular, there will be stride_x*stride_y*stride_p sub-filters where stride_x is the stride in the x direction (with respect to FIG. 1), stride_y is the stride in the y direction (with respect to FIG. 1), and stride_p is the stride in the p direction (with respect to FIG. 1). For example, where the filter W is one-dimensional (1D) in the x-direction (or x dimension) there will be stride_x sub-filters. In particular, a convolution transpose operation with a 1D filter and stride_x=4 there will be 4 sub-filters. Where the filter W is two-dimensional (2D) and the filter moves in both x and y directions (or in the x and y dimensions) with respect to the input tensor A there will be stride_x*stride_y sub-filters. Where the filter W is three-dimensional (3D) the number of sub-filters may depend on the number of directions or dimensions in which the filter moves with respect to the input tensor. For example, in a neural network a 3D filter is typically only moved in the x and y directions (or the x and y dimensions) with respect to a 3D input tensor, so there will only be stride_x*stride_y sub-filters. In contrast, where a 3D filter moves in the x, y and p directions with respect to the 3D input tensor there will be stride_x*stride_y*stride_p sub-filters.

In general, the maximum dimension of any the sub-filters will be $$\text{x\_sub\_filter\_max} * \text{y\_sub\_filter\_max wherein}$$

$$\text{x\_sub\_filter\_max} = \left\lceil \frac{\text{filter\_width}}{\text{stride\_x}} \right\rceil \text{ and}$$

$$\text{y\_sub\_filter max} = \left\lceil \frac{\text{filter\_height}}{\text{stride\_y}} \right\rceil.$$

While it may be beneficial to have all the sub-filters the same size there may not be enough weights to have each sub-filter having the maximum dimensions. Accordingly, in these cases, the sub-filters may be configured to have the maximum dimensions by adding one or more extra zeros to a sub-filter that has less than the maximum dimensions.

In some cases, the sub-filters of a filter W may be generated by forming a stride_x*stride_y*stride_p base block of filter weights from the origin of the filter W. The origin of a filter is the filter weight that is aligned with a particular input element to generate an output element for that input element. The origin of a filter is typically the first filter weight, the last filter weight or the centre filter weight, but it can be any filter weight. Once the base block is formed each sub-filter is formed from the filter weights at the stride increments starting from one of the filter weights in the base block.

Figure 19:
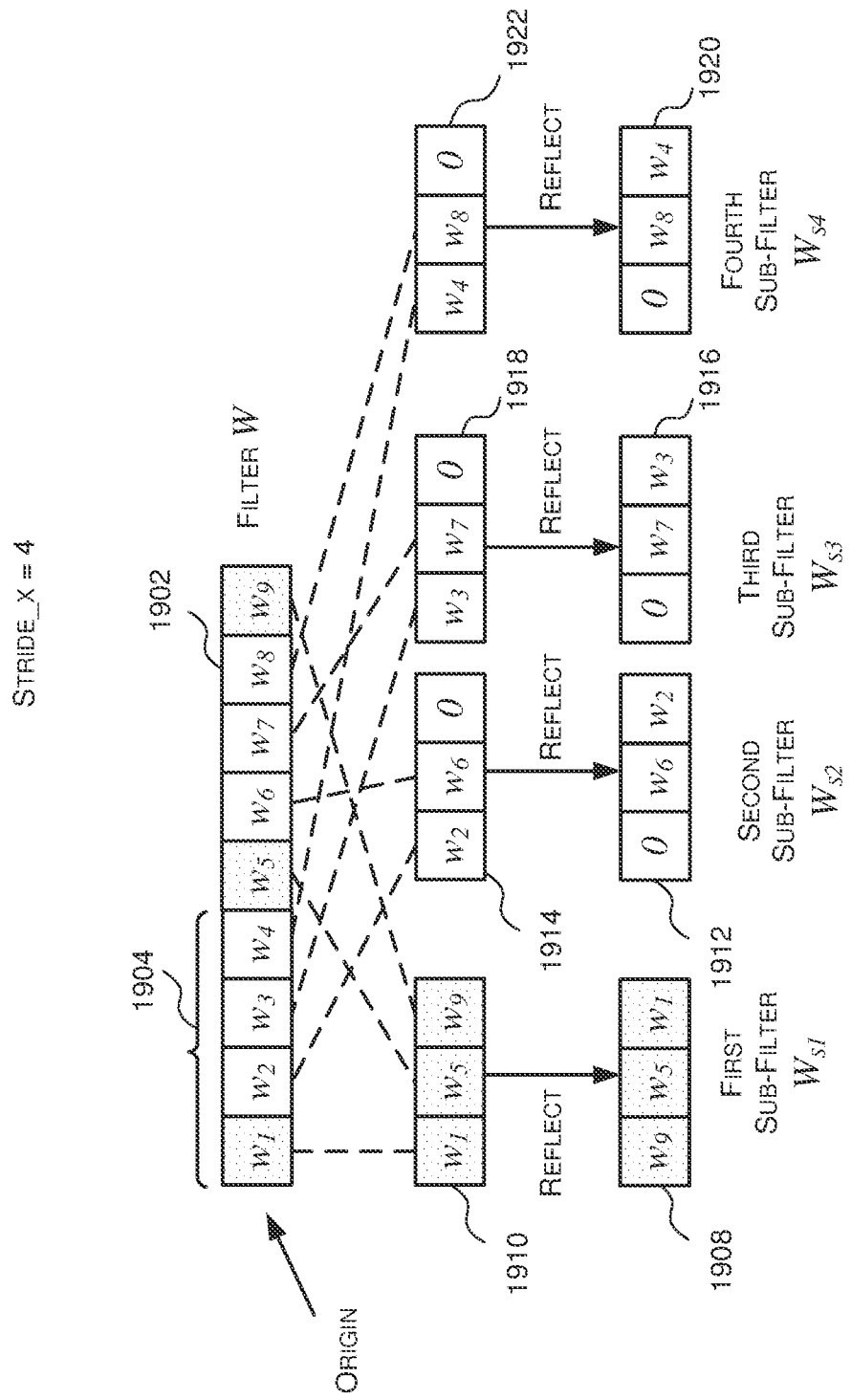
FIG. 19 is a schematic diagram illustrating generation of the sub-filters of a one-dimensional convolution transpose.

For example, where the stride in the x direction is 4 (i.e. stride_x=4) the four three-element sub-filters of the nine-element one-dimensional filter W 1902 shown in FIG. 19 may be generated by forming a 4-element base block 1904 from the origin $w_1$ of the filter W 1902. The $i^{th}$ sub-filter $W^{si}$ is then generated by (i) forming a 3 element filter from every $4^{th}$ filter weight in the filter W starting with the $i^{th}$ filter weight in the base block 1904; and (ii) generating a reflected version of that filter. Where the filter does not comprise a weight to fill out the filter then a zero is added to the filter. Specifically, the first sub-filter $W^{s1}$ 1908 is generated by forming a three-element filter 1910 from every $4^{th}$ filter weight in the filter W 1902 starting with the first filter weight $w_1$ in the base block 1904 and then generating a reflected version of that filter 1910. This results in the first sub-filter $W_{s1}$ 1908 comprising filter weights $w_9$, $w_5$ and $w_1$. The second sub-filter $W_{s2}$ 1912 is generated by forming a filter 1914 from every $4^{th}$ filter weight in the filter W 1902 starting with the second filter weight $w_2$ in the base block 1904 and generating a reflected version of that filter 1914. This results in the second sub-filter $W_{s2}$ 1912 comprising filter weights 0, $w_6$ and $w_2$. The third sub-filter $W_{s3}$ 1916 is generated by forming a filter 1918 from every $4^{th}$ filter weight in the filter W 1902 starting with the third filter weight $w_3$ in the base block 1904 and then generating a reflected version of that filter 1918. This results in the third sub-filter $W_{s3}$ 1916 comprising filter weights 0, $w_7$ and $w_3$. The fourth sub-filter $W_{s4}$ 1920 is generated by forming a three-element filter 1922 from every $4^{th}$ filter weight in the filter W 1902 starting with the fourth (or last) filter weight $w_4$ in the base block 1904 and generating a reflected version of that filter 1922. This results in the fourth sub-filter $W_{s4}$ 1920 comprising filter weights 0, $w_8$ and $w_4$.

Figure 20:
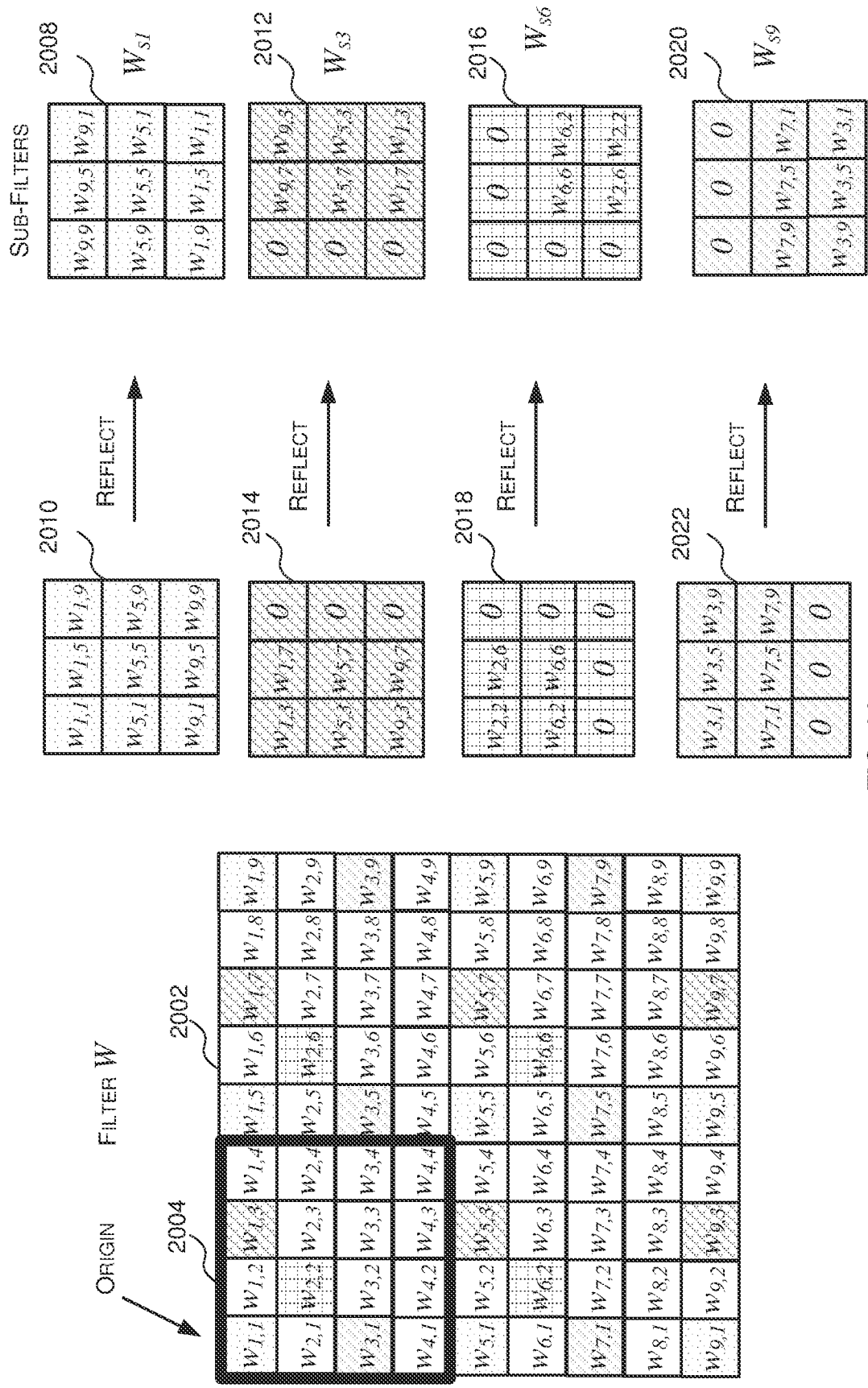
FIG. 20 is a schematic diagram illustrating generation of the sub-filters of a two-dimensional convolution transpose.

In another example, where the stride in the x and y directions is 4 (i.e. stride_x=4 and stride_y=4) the sixteen 3×3 sub-filters of the 9×9 filter W 2002 of FIG. 20 may be generated by forming a 4×4 element base block 2004 from the origin of the filter W 2002. Each 3×3 sub-filter is then generated by forming a 3×3 filter from every $4^{th}$ filter weight w in the x direction and every $4^{th}$ filter weight w in the y direction in the filter W 2002 starting with a different one of the filter weights in the base block 2004, and then generating a reflected version of that filter. For example, the first sub-filter $W_{s1}$ 2008 is generated by forming a 3×3 filter 2010 from every $4^{th}$ filter weight in the x direction and every $4^{th}$ filter weight in the y direction of the filter W 2002 starting with the first filter weight in the first row of the base block 2004 (i.e. $w_{1,1}$) and generating a reflected version of that filter 2010. This results in the first sub-filter $W_{s1}$ 2008 comprising filter weights $w_{9,9}$, $w_{9,5}$, $w_{9,1}$, $w_{5,9}$, $w_{5,5}$, $w_{5,1}$, $w_{1,9}$, $w_{1,5}$ and $w_{1,1}$. The third sub-filter $W_{s3}$ 2012 is generated by forming a 3×3 filter 2014 from every $4^{th}$ filter weight in the x direction and every $4^{th}$ filter weight in the y direction of the filter W 2002 starting with the third filter weight in the first row of the base block 2004 (i.e. $w_{1,3}$) and generating a reflected version of that filter 2014. This results in the third sub-filter $W_{s3}$ 2012 comprising filter weights 0, $w_{9,7}$, $w_{9,3}$, 0, $w_{5,7}$, $w_{5,3}$, 0 $w_{1,7}$ and $w_{1,3}$. The $6^{th}$ sub-filter 2016 (formed from 3×3 filter 2018) and the $9^{th}$ sub-filter 2020 (formed from 3×3 filter 2022) are generated in a similar manner.

It will be evident to a person of skill in the art that this is an example only and the sub-filters may be generated from the filter in another manner. For example, in another example, the filters may be generated by generating a reflected version of the filter and then selecting the elements for each sub-filter from the reflected version of the sub-filter.

Returning to FIG. 13, once the filter W has been divided into a plurality of sub-filters $W_{si}$ the method 1300 proceeds to block 1304.

At block 1304, a direct convolution operation is performed between a padded version of the input tensor A and each of the sub-filters $W_{si}$ with stride(s) of 1 (regardless of the stride(s) of the convolution transpose) to generate a plurality of sub-output tensors $B_{si}$. Each sub-output tensor comprises a plurality of output elements. For example, in the example of FIG. 12 where there are two sub-filters, a convolution operation is performed between a padded version of the input tensor A and each of the two sub-filters. Similarly, in the example of FIG. 19 where there are four sub-filters, a convolution operation is performed between a padded version of the input tensor and each of the four sub-filters to generate four sub-output tensors. Furthermore, in the example of FIG. 20 where there are sixteen sub-filters a convolution operation is performed between a padded version of the input tensor and each of the sixteen sub-filters to generate sixteen sub-output tensors.

Figure 5:
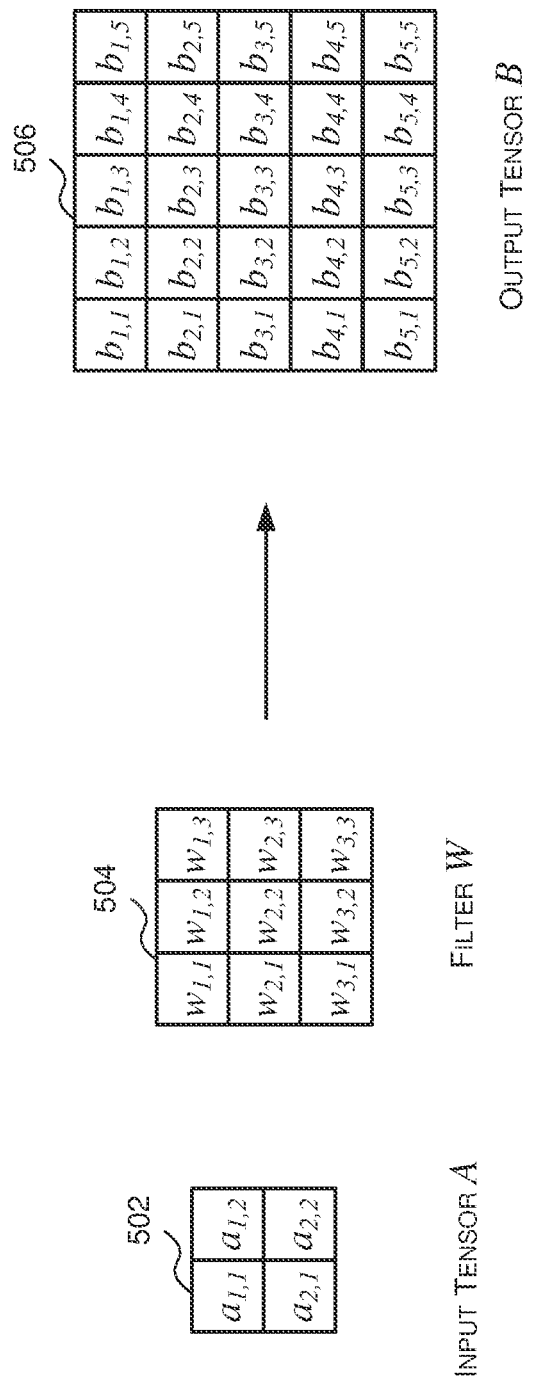
FIG. 5 is a schematic diagram illustrating a first example convolution transpose between an input tensor A and a filter W.
Figure 6:
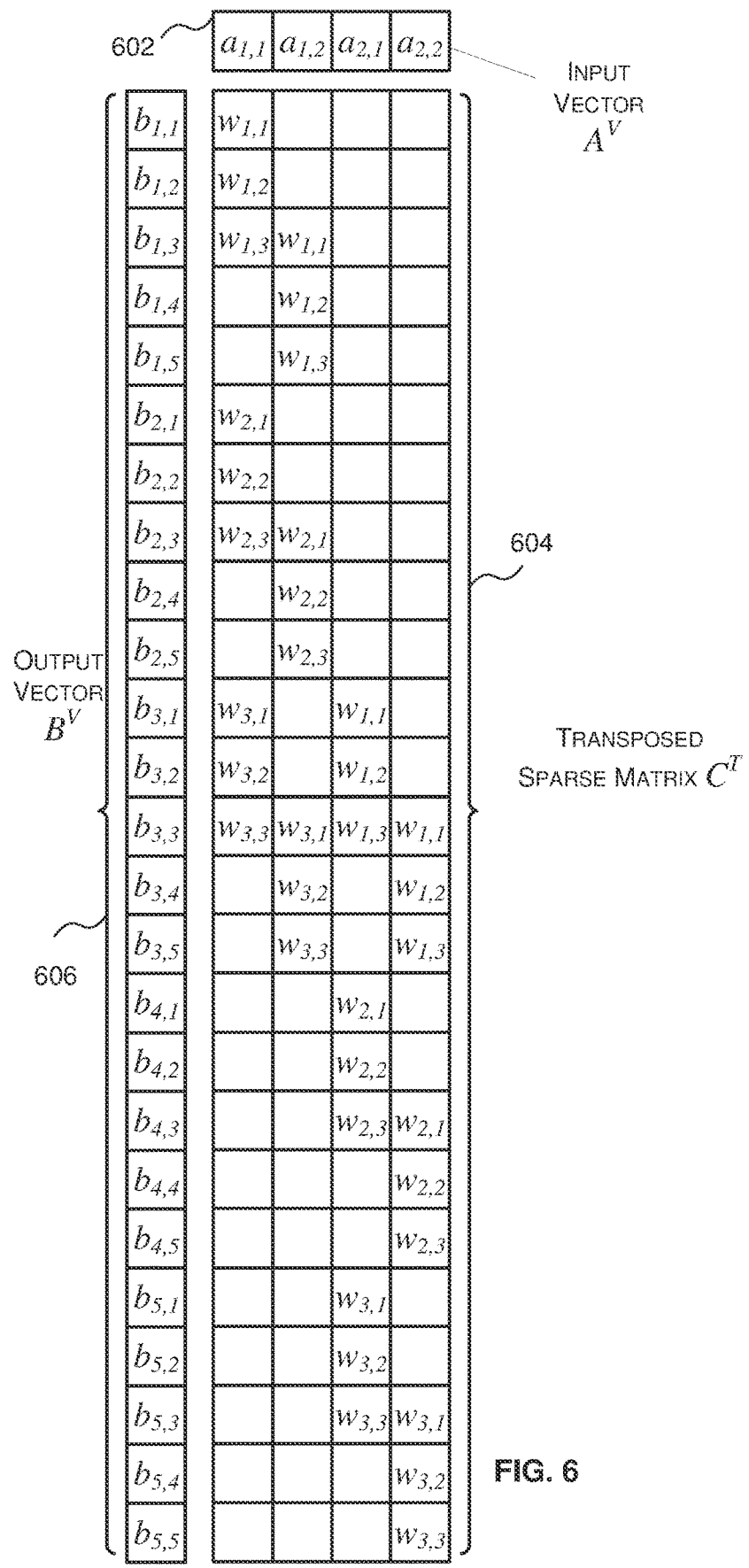
FIG. 6 is a schematic diagram illustrating the convolution transpose of FIG. 5 as a vector-matrix multiplication.
Figure 7:
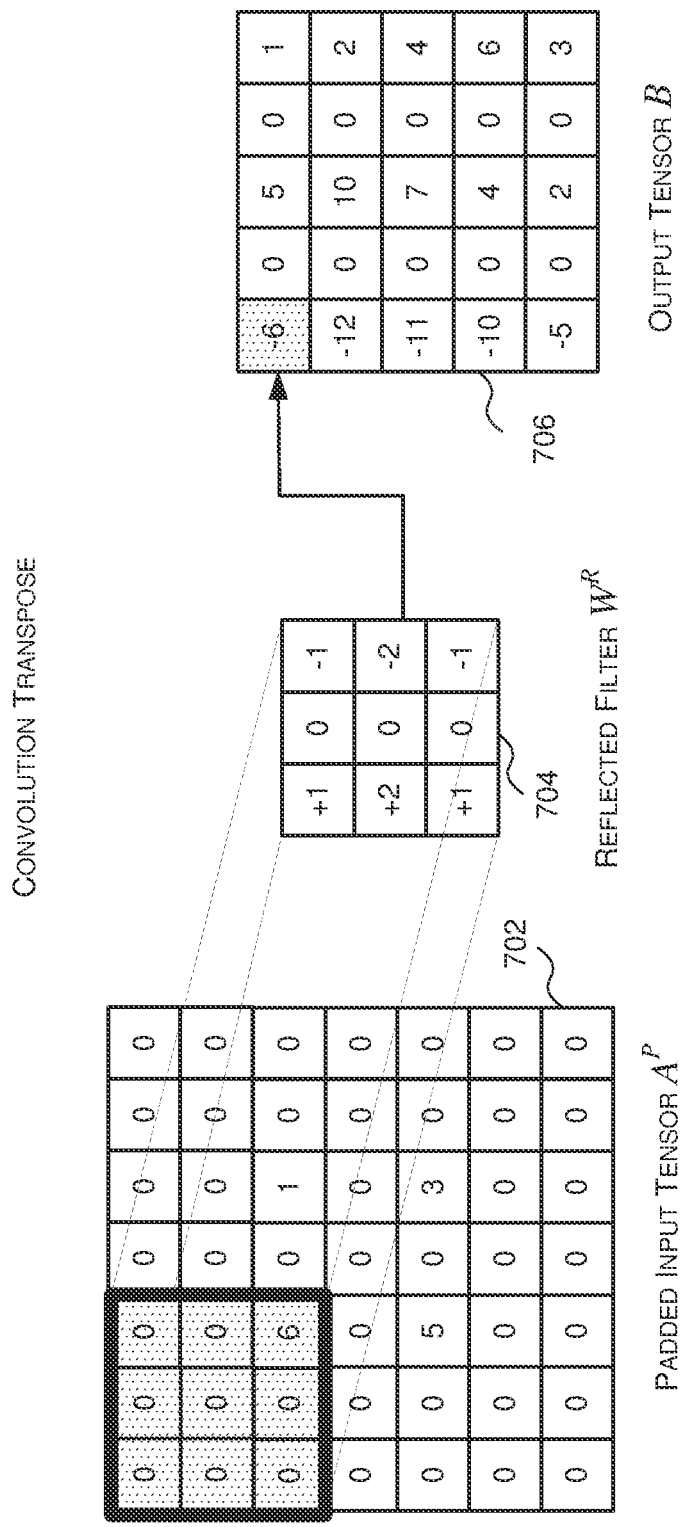
FIG. 7 is a schematic diagram illustrating the generation of a first output element of the output tensor for an example implementation of the convolution transpose of FIG. 5.

The padded version of the input tensor is generated by adding columns and/or rows of zeros to the input tensor based on the size of the sub-filters. For example, where the input tensor is a matrix, the padded version of the input tensor is generated by adding (x_sub_filter_max−1) columns of zeros to the left and right edges of the input tensor A, and adding (y_sub_filter_max−1) rows of zeros to the top and bottom edges of the input tensor A. For example, where the input tensor A is a 2×2 matrix as shown in FIG. 5 and x_sub_filter_max is 2 and y_sub_filter_max is 2 then a column of zeros is added to the left and right edges of the input tensor and a row of zeros is added to the top and bottom edges of the input tensor to generate a padded version of the input tensor as shown below.

| 0 | 0 | 0 | 0 |
|---|---|---|---|
| 0 | $a_{1,1}$ | $a_{1,2}$ | 0 |
| 0 | $a_{2,1}$ | $a_{2,2}$ | 0 |
| 0 | 0 | 0 | 0 |

As described above, to perform a convolution operation between an input tensor A and a sub-filter $W_{si}$ the sub-filter $W_{si}$ is slid across the input tensor A at steps in directions x, y and/or z. As noted above, the size of the step in a particular direction is referred to as the "stride" in that direction. At each step, the dot product of the overlapping input elements and the filter weights is calculated to produce an output element or output value of the sub-output tensor $B_{si}$.

The direct convolution operations may be performed by one or more convolution engines. The term "convolution engine" is used herein to refer to dedicated hardware (e.g. an integrated circuit) for performing convolution operations. An example convolution engine is described below with respect to FIG. 23. Once the sub-output tensors have been generated the method 1300 proceeds to block 1306.

At block 1306, the output elements of the sub-output tensors $B_{si}$ are interleaved to form the final output tensor B. In general the output elements of the sub-output tensors are interleaved in sub-filter order in accordance with the stride in each direction. Specifically, if the convolution transpose has a stride in the x direction (or x dimension) that is greater than 1 (i.e. stride_x>1) each row of the final output tensor is generated by selecting elements from stride_x sub-output tensors in a round-robin manner. If the transpose convolution has a stride in the y direction (or the y dimension) that is greater than 1 (i.e. stride_y>1) every stride_$y^{th}$ row is generated by selecting elements from the same stride_x sub-output tensors. For example for a convolution transpose that generates a 4×4 output tensor with stride_x=2 and stride_y=2 there will be four sub-filters numbered 1 to 4. The first row and the third row of the output tensor are generated by alternating between elements of the $1^{st}$ and $2^{nd}$ sub-output tensors and the second and forth rows are generated by alternating between elements of the $3^{rd}$ and $4^{th}$ sub-output tensors.

For example, in the example convolution transpose of FIGS. 10-12 where the one-dimensional filter is divided into two sub-filters, the direct convolution between the one-dimensional input tensor and the first sub-filter produces the even output elements of the final output tensor; and the direct convolution between the input tensor and the second sub-filter produces the odd output elements of the final output tensor, thus the final output tensor can be generated by alternating between output elements of the two sub-output tensors.

Figure 21:
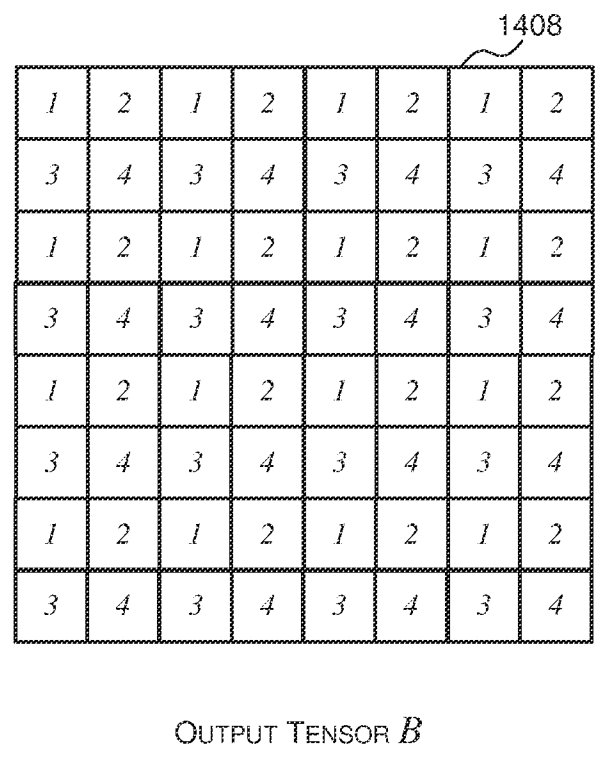

Similarly, in the example convolution transpose of FIGS. 14-18 where the two-dimensional filter is divided into four sub-filters, the direct convolution between the input tensor and the first sub-filter will produce the output elements in odd numbered rows and odd numbered columns; the direct convolution between the input tensor and the second sub-filter will produce the output elements in odd numbered rows and even numbered columns. Accordingly the odd rows of the final output tensor can be generated by alternating between the output elements of the first and second sub-output tensors. In a similar manner the direct convolution between the input tensor and the third sub-filter will produce the output elements in even numbered rows and odd numbered columns; and the direct convolution between the input tensor and the fourth sub-filter will produce the output elements in even numbered rows and even numbered columns. Accordingly, the even rows of the final output tensor can be generated by alternating between the output elements of the third and fourth sub-output tensors. This is shown in FIG. 21 where a "1" indicates that an output element was generated by the first sub-filter, a "2" indicates that an output element was generated by the second sub-filter, a "3" indicates that an output element was generated by the third sub-filter, and a "4" indicates that an output element was generated by the fourth sub-filter.

In some cases, the interleaving may be performed by an interleave engine. The term "interleave engine" is used herein to refer to dedicated hardware (e.g. an integrated circuit) configured to interleave multiple tensors to form a final output tensor. An example interleave engine is described with respect to FIG. 22.

While the output tensor generated by interleaving the elements of the sub-output tensors will have an output element for each window of the padded version of the input tensor, in some cases not all of the elements of the output tensor will be valid. For example, if during the corresponding convolution operation the input tensor is padded with one or more zeros prior to performing the convolution, the values in the corresponding convolution transpose that correspond to the zero padding are not valid and can be discarded. This concept will be described with reference to FIGS. 9 to 12. Specifically, in the convolution operation shown in FIG. 9 the input tensor is padded with a leading zero so that the first element of the output tensor is equal to $a_1*w_2+a_2*w_3$. In the corresponding convolution transpose operation shown in FIGS. 10 to 12 the output element of the convolution transpose that corresponds to the padding zero (i.e. $a_1*w_1$) is not valid and can be discarded or cropped from the output tensor as shown in FIG. 12. Accordingly, where the output tensor has one or more invalid elements due to zero padding of the input in the corresponding convolution operation then the invalid elements can be cropped from the final output tensor before outputting the final output tensor.

Once the final output tensor B has been generated the method 1300 ends.

Figure 22:
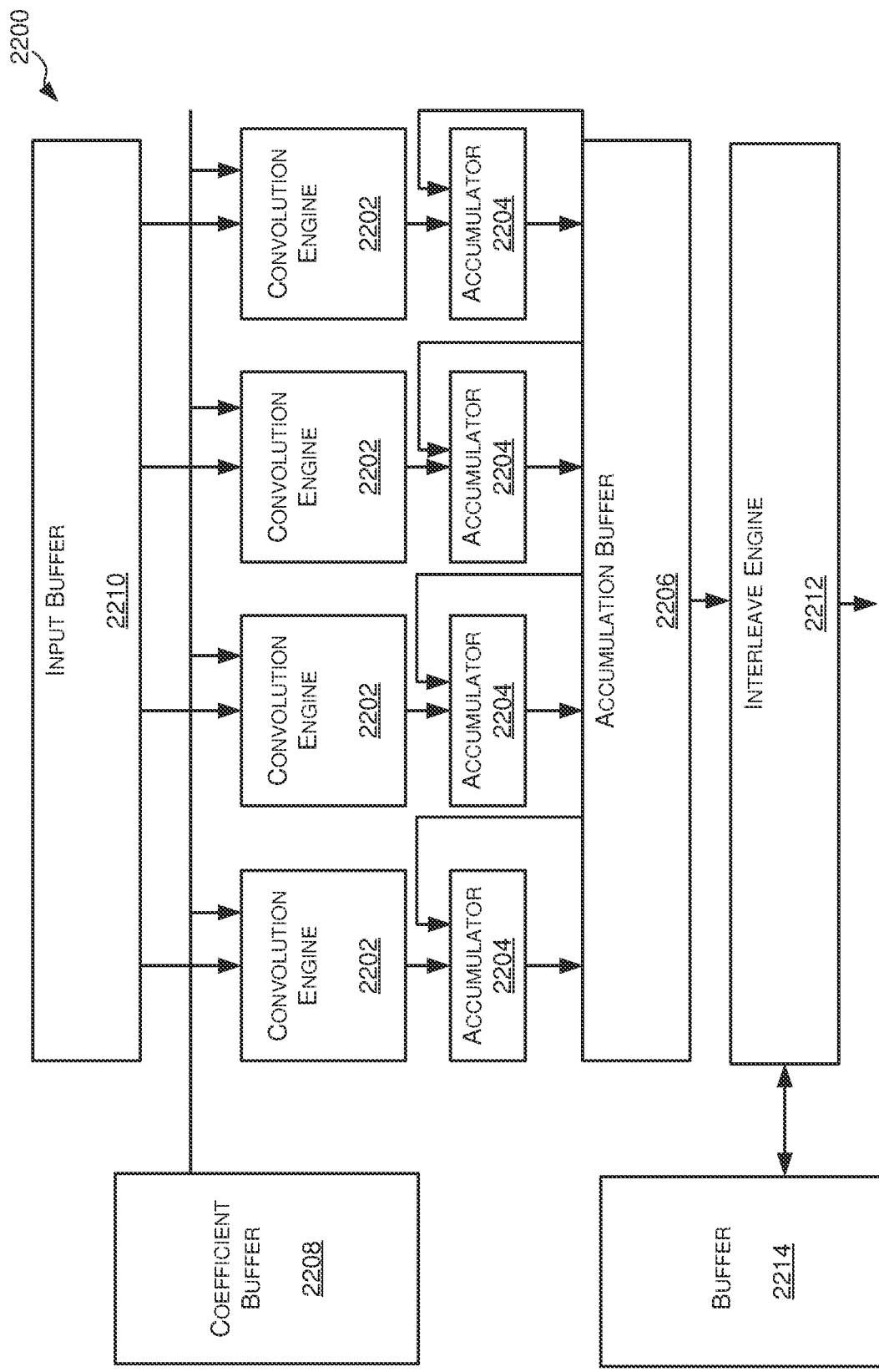
FIG. 22 is a block diagram of an example system for performing a convolution transpose between an input tensor and a filter.

Reference is now made to FIG. 22 which illustrates an example system 2200 for performing a convolution transpose operation in accordance with the method 1300 of FIG. 13. The system 2200 comprises one or more convolution engines 2202 and an interleave engine 2212. In some cases, the system 2200 may also comprise one or more accumulators 2204, an accumulation buffer 2206, a coefficient buffer 2208 (which may also be referred to as a filter buffer), and/or an input buffer 2210.

The convolution engine(s) 2202 (optionally in combination with one or more accumulator(s) 2204 and an accumulation buffer 2206) are configured to perform a direct convolution between an input tensor and each of a plurality of sub-filters to generate a plurality of sub-output tensors.

Figure 23:
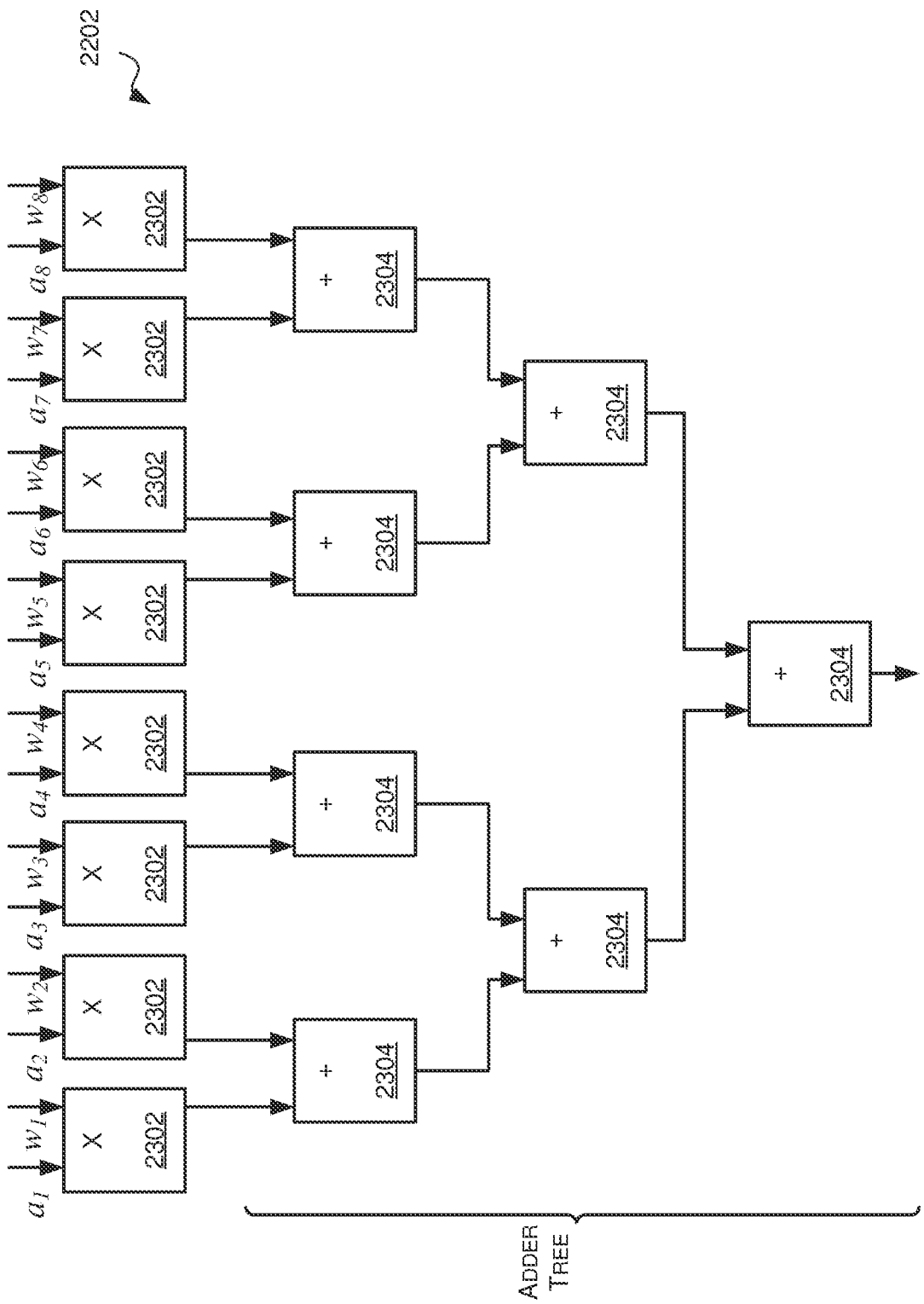
FIG. 23 is a block diagram of an example convolution engine.

Specifically, each convolution engine 2202 comprises hardware logic configured to receive a set of weights $\{w_1 \ldots w_8\}$ that represent all or a portion of a sub-filter, and a set of input elements $\{a_1 \ldots a_8\}$ that represent all or a portion of a window of the input tensor A, and perform a multiply-accumulate calculation on the received weights and input elements. In some examples, as shown in FIG. 23, each convolution engine 2202 may comprise a plurality of multipliers 2302, each of which is configured to multiply a weight ($w_i$) and a corresponding input element ($a_i$) to produce a multiplication output value. The multipliers 2302 are followed by a plurality of adders 2304 that form an adder tree to calculate the sum of the multiplication outputs. In the example of FIG. 23 the convolution engine 2202 comprises eight multipliers 2302, but in other examples there may be more or fewer multipliers. For example, in some cases there may be 128 multipliers. Generally, if there are K multipliers 2302 the adder tree comprises K−1 adders 2304.

In some cases, the multiply-accumulate calculation may be pipelined. For example, the multipliers 2302 and adders 2304 may be divided into a number of pipeline stages with a register stage (not shown) before the first pipeline stage and between each pair of pipeline stages. For example, the multipliers may form a first pipeline stage and the adders may be divided into layers wherein the subsequent pipeline stages comprise one or more layers of adders.

The example system 2200 FIG. 22 comprises four convolution engines 2202, however, it will be evident to a person of skill in the art that the methods and principles described herein are applicable to systems with one or more convolution engines.

When a convolution engine 2202 receives a set of weights and a set of input elements and generates the multiply-accumulate result thereof, that is referred to herein as a hardware pass of the convolution engine 2202. In some cases, it may take more than one hardware pass of a convolution engine 2202 to generate an output element of a sub-output tensor. This may be because the convolution engine can only receive and process a portion of the weights of a sub-filter and/or a portion of the input data values of a window in a hardware pass. For example, if a sub-filter comprises eight filter weights then each output element of the output tensor will be calculated by multiplying and accumulating eight input elements with the eight filter weights. If a convolution engine 2202 is only able to receive and process four input elements and four filter weights in a single hardware pass, then at least two passes will be required to generate an output element. Specifically, in a first hardware pass of the convolution engine four of the filter weights are multiplied and accumulated with the corresponding input elements, and in a second hardware pass of the convolution engine the remaining four of the filter weights are multiplied and accumulated with the corresponding input elements. The output of a convolution engine that does not form an output element on its own is referred to herein as a partial result or a partial output element. The final output element is then generated by adding the partial output elements of the two hardware passes together.

Accordingly, in these cases the system 2200 may comprise one or more accumulators 2204 and an accumulation buffer 2206 that allow the outputs of different hardware passes of the convolution engines to be added together. Specifically, each accumulator 2204 receives the output of one convolution engine 2202 and adds the output to a previous convolution engine output that relates to the same sub-filter. Since the convolution engine may not generate or produce outputs that relate to the same sub-filter in consecutive hardware passes the partial results of one or more sub-filters may be stored in an accumulation buffer 2206 and then the appropriate partial result may be provided to the accumulator 2204 each cycle by the accumulation buffer 2206. In some examples, the accumulation buffer 2206 may be able to store partial results related to 128 different sub-filters.

In some cases, the system 2200 may comprise a coefficient buffer 2208 configured to store a plurality of filter weights to be processed by the convolution engine(s) and to provide the stored filter weights to the convolution engine(s) 2202 for processing. In these cases, the coefficient buffer 2208 may comprise memory (not shown) to store the filter weights of the sub-filters and hardware logic (not shown) to provide the weights to the convolution engines 2202 for processing in a predetermined order over a plurality of cycles. The weights that are stored in the coefficient buffer 2208 at any one time may comprise the weights of all the sub-filters, the weights of only a portion of the sub-filters, or only a portion of the weights of one or more sub-filters.

In some cases, the coefficient buffer 2208 may be configured to provide the same set of weights to all convolution engines each cycle. Specifically, the coefficient buffer 308 may be configured to output, each cycle, one set of weights which represents all or part of a sub-filter, which is provided to all convolution engines 2202. For example, the coefficient buffer 2208 may be configured to provide a set of weights that represent all or part of a first sub-filter to all convolution engines in one cycle. Providing the same set of weights to all the convolution engines each cycle may reduce the output bandwidth required by the coefficient buffer because the coefficient buffer only needs to output one set of weights per cycle. Providing the same set of weights to all convolution engines 2202 each cycle may also reduce the power consumed by the coefficient buffer 2208 in fetching or reading the weights.

In some cases, the system 2200 may also comprise a coefficient buffer controller (not shown) which may be configured to obtain the weights of the sub-filters from external memory (not shown) via a memory interface (not shown) and store the received weights in the coefficient buffer 2208. The weights may be stored in a predetermined order in the external memory which is replicated in the coefficient buffer 2208 so that the coefficient buffer has to merely read and output the weights in the order stored in the coefficient buffer 2208. The external memory may be considered as a separate module to the system 2200 or may be considered to be part of, or integrated with, the system 2200.

Although the coefficient buffer 2208 is shown in FIG. 22 as a single component the coefficient buffer 2208 may be implemented by a plurality of sub-coefficient buffers that each form a bank of the coefficient buffer.

In some cases, the system 2200 may comprise an input buffer 2210 configured to store a plurality of input elements to be processed by the convolution engine(s) and to provide the stored input elements to the convolution engine(s) 2202 for processing. In these cases the input buffer 2210 may comprise memory (not shown) to store a plurality of input elements of an input tensor and hardware logic (not shown) to provide the input elements to the convolution engines 2202 for processing in a predetermined order over a plurality of cycles. The input elements stored in the input buffer 2210 at any one time may comprise all of the input elements of the input tensor or only a portion of the input elements of the input tensor.

In some cases, the input buffer 2210 may be configured to provide each convolution engine 2202 a different set of input elements each cycle. For example, in one cycle, the convolution engine 2202 may provide a set of input elements that represent all or a portion of a first window of the input tensor to the first convolution engine 2202, provide a set of input data values that represent all or a portion of a second window of the input tensor to the second convolution engine 2202, provide a set of input data values that represent all or a portion of a third window of the input tensor to the third convolution engine 2202, and provide a set of input data values that represent all or a portion of a fourth window of the input tensor to the fourth convolution engine 2202.

In some cases, the system 2200 may also comprise an input buffer controller (not shown) which may be configured to obtain the input elements of the input tensor from external memory (not shown) via a memory interface (not shown) and store the received weights in the input buffer 2210. The external memory may be considered as a separate module to the system 2200 or may be considered to be part of, or integrated with, the system 2200.

Although the input buffer 2210 is shown in FIG. 22 as a single component the input buffer 2210 may be implemented by a plurality of sub-input buffers that each form a bank of the input buffer.

The interleave engine 2212 comprises hardware logic configured to receive the plurality of sub-output tensors generated by the convolution engines 2202 (and, optionally the accumulators 2204 and accumulation buffer 2206) and interleave the elements of the sub-output tensors to generate the final output tensor of the convolution transpose. For example, in the example convolution transpose of FIGS. 10-12 where the filter is divided into two sub-filters, the direct convolution between the input tensor and the first sub-filter produces the odd output elements of the final output tensor and the direct convolution between the input tensor and the second sub-filter produces the even output elements of the final output tensor, thus the final output tensor can be generated by alternating between output elements of the two sub-output tensors.

Similarly, in the example convolution transpose of FIGS. 14-18 with stride_x=2 and stride_y=2 the filter is divided into four sub-filters. The direct convolution between the input tensor and the first sub-filter will produce the output elements in odd numbered columns and odd numbered rows; the direct convolution between the input tensor and the second sub-filter will produce the output elements in even numbered columns and odd numbered rows. Accordingly the odd rows of the final output tensor can be generated by alternating between the output elements of the first and second sub-output tensors. In a similar manner the direct convolution between the input tensor and the third sub-filter will produce the output elements in odd numbered columns and even numbered rows; and the direct convolution between the input tensor and the fourth sub-filter will produce the output elements in even numbered columns and even numbered rows. Accordingly the even rows of the final output tensor can be generated by alternating between the output elements of the third and fourth sub-output tensors.

In some examples, the interleave engine 2212 may have access to a storage unit such as a buffer 2214 and the interleave engine 2212 may be configured to generate the final output tensor by storing all or a portion of the output elements of the sub-output tensors in the storage unit (e.g. buffer 2214) and generating the final output tensor by reading the stored output elements from the storage unit (e.g. buffer 2214) in a predetermined order. In these cases the interleave engine 2212 may comprise a buffer write module (not shown) that is configured to write data (e.g. sub-output tensor elements) to the internal storage unit (e.g. buffer 2214) and a buffer read module (not shown) that is configured to read data (e.g. sub-output tensor elements) from the internal storage unit (e.g. buffer 2214) to generate the final output tensor. The buffer write module may comprise a smaller buffer within it to store data that is written to the internal storage unit (e.g. buffer 2214).

In some examples, the interleave engine 2212 may receive for each convolution transpose, information (e.g. data within a command stream) indicating the width and height of the convolution transpose window (e.g. dx and dy respectively which may also be referred to as the width and height of the sub-output tensors (i.e. x_sub_filter_max and y_sub_filter_max)), the dimensions of the final output tensor, and/or information indicating how the sub-output tensors are to be interleaved to generate the final output tensor. The interleave engine 2212 may be configured to determine the location of where data is stored in the internal storage unit (e.g. buffer 2214) based on the command stream information (e.g. the dimensions of the final output tensor, dx, dy). In some cases the interleave engine 2212 may be configured buffer up dy lines of data simultaneously before reading them from the internal storage unit (e.g. buffer 2214).

When the system 2200 comprises a coefficient buffer and/or an input buffer, when the system 2200 processes the input elements in the input buffer and/or the filter weights in the coefficient buffer that is referred to herein as a hardware pass of the system 2200. In other words, a hardware pass of the system is the processing that can be performed without having to read more input elements or filter weights from memory. A convolution transpose can be performed most efficiently if the convolution transpose can be performed in a single hardware pass of the system 2200. There may, however, be a number of hardware limitations that dictate whether or not a convolution transpose can be performed in a single hardware pass of the system 2200. Such hardware limitations may include one or more of: the size of the input buffer, the size of the coefficient buffer, the size of the memory accessible to the interleave engine for performing the interleaving, and the number of filters that can be processed by the convolution engine(s) in a hardware pass of the system 2200.

For example, where the system 2200 comprises an input buffer a convolution transpose can only be processed in a single hardware pass of the system 2200 if the number of input elements that can be stored by the input buffer is greater than or equal to the number of input elements in the input tensor. The number of input elements that can be stored in the input buffer will be based on the size of the input buffer and the number format of the input elements. For example, in some cases the system 2200 may be able to support a plurality of number formats each with a different bit depth. In particular, in some cases the system 2200 may be configured to receive and process the input elements in a fixed point number format wherein each input element a is represented by a fixed integer exponent e and an n-bit mantissa m format $a=2^e m$ which is defined by the exponent e and the number n of mantissa bits {e, n}. In some cases, the mantissa m may be represented in two's complement format, and in other cases other signed or unsigned integer formats may be used. The number of mantissa bits (i.e. the bit length) and/or the exponent may vary between convolution transposes. Specifically, different convolution transpose operations may use fixed point number formats for the input elements with a different number of bits and/or a different exponent. In these cases, the larger the bit-depth of the fixed point number format for the input elements, the fewer input elements can be stored in the same sized input buffer.

Similarly, where the system 2200 comprises a coefficient buffer, a convolution transpose can only be processed in a single hardware pass of the system 2200 if the number of filter weights that can be stored by the coefficient buffer is greater than or equal to the number of filter weights in the plurality of sub-filters. The number of filter weights that can be stored in the coefficient buffer will be based on the size of the coefficient buffer and the format of the filter weights. For example, in some cases the system 2200 may be configured to receive and process filter weights in a fixed point number format defined by a fixed integer exponent and a number of mantissa bits (i.e. a bit length) as described above. Different convolution transpose operations may use fixed point number formats for the filter weights with a different number of bits and/or a different exponent. In these cases, the larger the bit-depth of the fixed point number format for the filter weights, the fewer filter weights that can be stored in the same sized coefficient buffer.

As described above, the interleave engine 2212 may be configured to perform the interleaving of the elements of the sub-output tensors by storing all or portion of the sub-output tensors in a storage unit (e.g. buffer 2214) accessible to the interleave engine 2212 and outputting the stored elements in a particular order. In these cases, a convolution transpose may only be able to be processed in a single hardware pass of the system 2200 if the storage unit (e.g. buffer 2214) accessible to the interleave engine 2212 is able to store sufficient data to be able to perform the interleaving. In some cases, the minimum amount data that the interleave engine must be able to store is data for dy lines of the final output tensor where dy is the height of the sub-tensor outputs (i.e. y_sub_tensor_max). In some cases, the amount of data that needs to be stored in the storage unit (e.g. buffer) is dictated by equations (3) and (4) wherein WPL (words per line) is the amount of data to be stored, $A_{size}$ is the size of the input tensor A (e.g. X*Y), stride_x is the stride in the x direction, stride_y is the stride in the y direction, ceil is the ceiling function, P is the number of planes in the output, NP is the number of sub-output tensors that are interleaved together to form a line or row of the final output tensor, NP' is NP/16 rounded up.

$$WPL_{BE\_BYP} = \frac{A_{size} * \text{stride\_x} * \text{stride\_y} * \text{ceil}\left(\frac{P}{NP}\right) * NP\prime}{NB * PK} \quad (3)$$

$$CURR_{BYP\_SIZE} = WPL_{BE\_BYP} \quad (4)$$

In some cases, the convolution engine(s) 2202 and/or the interleave engine 2212 may restrict the number of sub-filters of a convolution transpose that can be processed in a single hardware pass. In these cases, a convolution transpose can only be processed in a single hardware pass of the system 2200 if the number of sub-filters of the convolution transpose is less than or equal to the maximum number of sub-filters that can be processed in a single hardware pass. For example, in some cases the convolution engine(s) may only be able to generate output tensors for a maximum number of filters/sub-filters R (e.g. 128) per hardware pass and the interleave engine 2212 may be configured to generate the output tensors for G (e.g. 4) convolution transposes in parallel. In these cases, the total number of sub-filters per convolution transpose that can be processed per hardware pass of the system 2200 is thus R/G (e.g. 32).

If any of these hardware constraints dictate that a particular convolution transpose cannot be performed in a single hardware pass of the system 2200 then either the parameters of the convolution transpose may be adjusted (e.g. the bit width of the fixed point number format used for the filter weights and/or the input elements) or the convolution transpose may be implemented over a plurality of hardware passes of the system 2200. A convolution transpose may be implemented over multiple hardware passes of the system 2200 by splitting the sub-filters over multiple hardware passes of the system 200 or splitting the input elements of the input tensor over multiple hardware passes. Splitting the sub-filters over multiple hardware passes means that in each hardware pass the convolution engine(s) 2202 will process a different subset of the plurality of sub-filters to generate a subset of the sub-output tensors. Splitting the input elements of the input tensor over multiple hardware passes means that in each hardware pass the convolution engine(s) 2202 will generate a portion of one or more sub-output tensors each hardware pass. The portions of each sub-output tensor are then put together to form that sub-output tensor.

In either case, a convolution transpose implemented over multiple hardware passes is less efficient than a convolution transpose implemented in a single hardware pass as implementing a convolution transpose over multiple hardware passes increases the bandwidth between the system 2200 and external memory as either the filter weights or the input elements have to be re-read from memory into the input buffer or coefficient buffer in subsequent hardware passes. In addition, where the input data is split between hardware passes partial results may have to be written out at the end of one hardware pass and read back into the system 2200 in a subsequent hardware pass.

Figure 24:
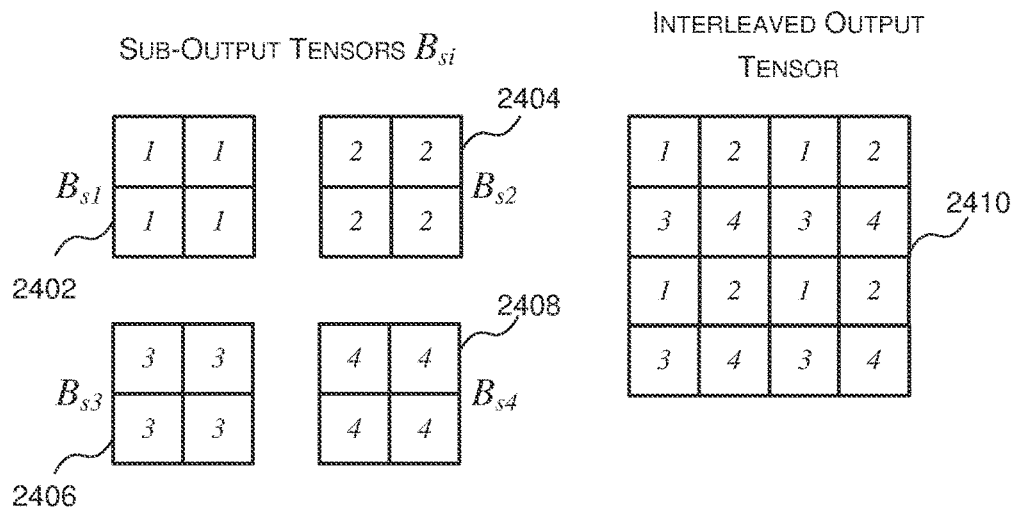
FIG. 24 is a schematic diagram illustrating splitting an example set of sub-filters over a plurality of hardware passes of the system of FIG. 22.
Figure 24:
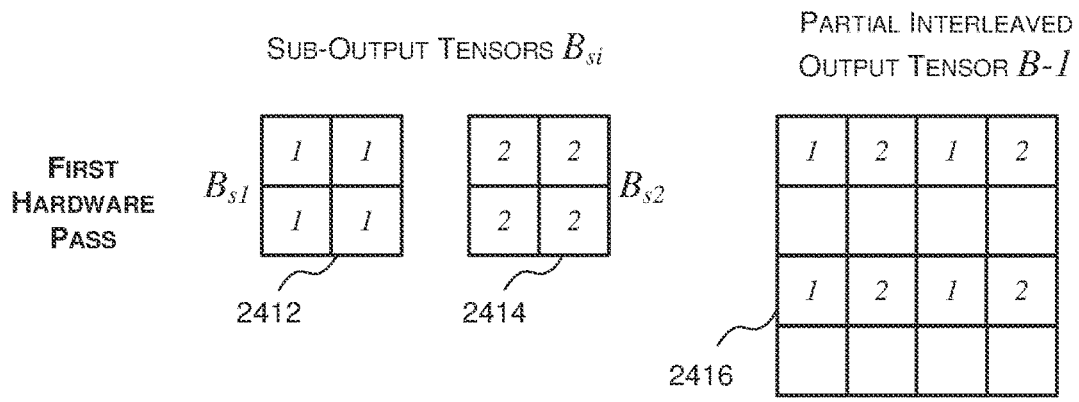
Figure 24:
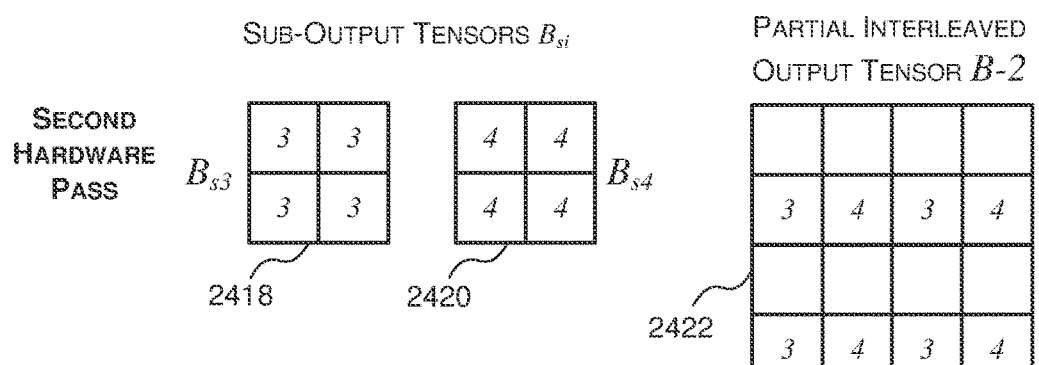

In some cases, the sub-filters of a convolution transpose may be split over multiple hardware passes such that sub-filters that generate output elements that are in the same row(s) of the output tensor are processed in the same hardware pass of the system 2200. This results in the convolution transpose being spread across stride_y hardware passes of the system 2200. For example, as described above a filter for a stride_x=2 and stride_y=2 convolution transpose is divided into four sub-filters numbered 1 to 4. If the convolution transpose is performed in a single hardware pass then as shown in FIG. 24 the convolution engine(s) 2202 will generate four sub-output tensors $B_{s1}$ 2402, $B_{s2}$ 2404, $B_{s3}$ 2406 and $B_{s4}$ 2408 in that hardware pass and the interleave engine 2212 will generate the final interleaved output tensor B 2410 by interleaving the sub-output tensors 2402, 2404, 2406, 2408. In contrast, if the convolution transpose is performed over multiple hardware passes where in each hardware pass the sub-output tensors that comprise output elements in the same row(s) of the final output tensor B are generated, then as shown in FIG. 24 the convolution transpose is implemented over two hardware passes. In a first hardware pass the convolution engine(s) are configured to generate first and second sub-output tensors $B_{s1}$ 2412, $B_{s2}$ 2414 as they comprise the output elements of the odd rows of the output tensor. The interleave engine 2212 then interleaves the output elements of the first and second sub-output tensors to generate the odd rows of the output tensor 2416. In the second hardware pass the convolution engine(s) 2202 are configured to generate the third and fourth sub-output tensors $B_{s3}$ 2418 and $B_{s4}$ 2420 as they comprise the output elements of the even rows of the output tensor. The interleave engine 2212 then interleaves the output elements of the third and fourth sub-output tensors 2418 and 2420 to generate the even rows of the output tensor 2422.

In these cases, the interleave engine 2212 may be configured to perform the interleaving of the subsets of sub-output tensors generated in a hardware pass as described above (e.g. by writing the output elements of the sub-output tensors to a storage module (e.g. buffer 2214) and reading the output elements from the storage module in a predetermined order). In this way the horizontal interleaving (the interleaving in the x direction (or x dimension)) is done by the interleave engine 2212 as it reads the output elements from the storage unit (e.g. buffer 2214). However, the vertical interleaving (the interleaving in the y direction (or y dimension) is performed by the interleave engine 2212 when the interleave engine 2212 writes the interleaved rows to external memory by adjusting the rows of the final output tensor that are written to by adjusting the addresses that are written to. Specifically, this may be accomplished by the interleave engine 2212 by increasing the line stride by a factor of stride_y so that the output elements of the sub-output tensors of a hardware pass are only used to fill every stride_$y^{th}$ line of an output tensor and adjusting the start address that is written to based on which set of sub-filters are being processed in a particular hardware pass.

In some cases, the elements of the input tensor may be split up and processed in separate passes of the system 2200. In these cases it may be advantageous to split up the elements of the input tensor so that each hardware pass progresses to an x position that exactly fills a memory burst. However, this can be complicated for a convolution transpose because the system 2200 may not have access to every x position, only every dx x positions, as dx x positions may be generated in parallel. In some cases where the burst size is 128 bytes and there are 8 bits per byte there may be $$BURST_x = \text{floor}\left(\frac{128*8}{NP*BITDEPTH}\right)$$

elements written out in each burst where BITDEPTH is the number of bits used to represent each element. The BITDEPTH is typically 8 or 16 bits, but it can be any integer. For example, in some cases the BITDEPTH may be any integer in the set {4, 5, 6, 7, 8, 10, 12 or 16}. Preferably in each hardware pass an output burst is completed such that a new pass can start on a new output burst. Therefore the start position dx*$x_{inp}$, wherein $x_{inp}$ is the x location according to the input of the interleave module, before the sub-tensor outputs are deinterleaved into x positions, is preferably a multiple of $BURST_x$. If dx is not a power of 2, it may not be possible to align on every burst.

In some cases, the system 2200 for performing a convolution transpose between an input tensor and a filter may form part of a DNN accelerator. A DNN accelerator comprises hardware logic configured to process input data to a DNN in accordance with the layers of the DNN. Specifically, a DNN accelerator comprises hardware logic configured to process the input data to each layer of the DNN in accordance with that layer and generate output data for each layer which either becomes the input data to another layer or becomes the output of the DNN. For example, if a DNN comprises a convolution layer followed by an activation layer the DNN accelerator for that DNN comprises hardware logic configured to perform a convolution on the input data to the DNN using the weights associated with that convolution layer to produce output data for the convolution layer, and hardware logic configured to apply an activation function to the input data to the activation layer (i.e. output of the convolution layer) to generate output data for the DNN.

Example DNN Accelerator

Figure 25:
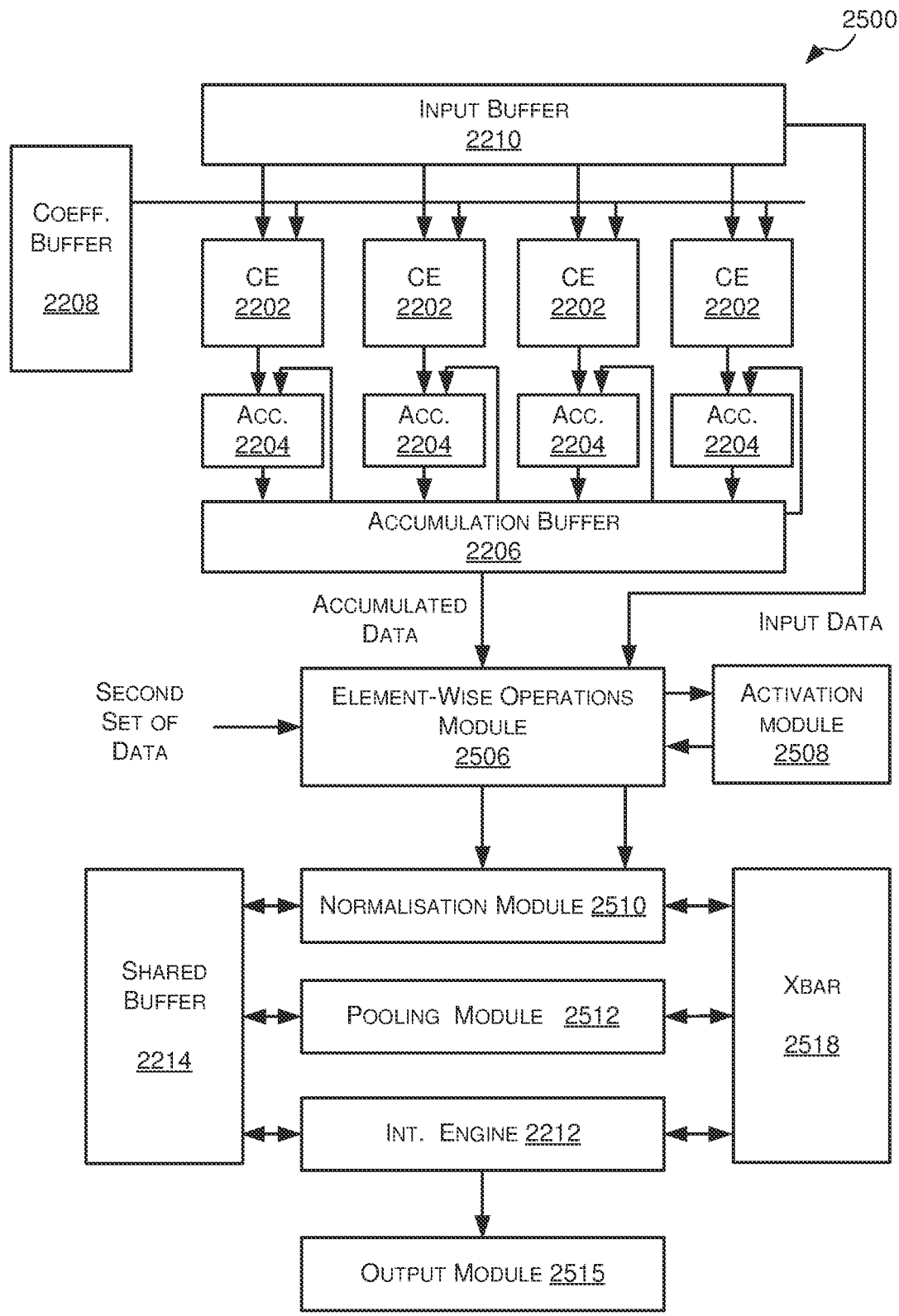
FIG. 25 is an example DNN accelerator comprising the system of FIG. 22.

Reference is now made to FIG. 25 which shows an example DNN accelerator 2500 in which the system 2200 of FIG. 22 for performing a convolution transpose of a DNN described herein may be implemented. The system 2200 of FIG. 22 not only allows the DNN accelerator to process convolution transpose layers, but the convolution engines (and the accumulators and accumulation buffer) can also be used to process other layers that perform matrix multiplications such as convolution layers and fully-connected layers.

The DNN accelerator 2500 of FIG. 25 is configured to compute the output of a DNN through a series of hardware passes (which also may be referred to as processing passes) of the DNN accelerator wherein during each pass the DNN accelerator 2500 receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the DNN accelerator 2500 can process during a single hardware pass may be based on the size of the data, the DNN accelerator 2500 and the order of the layers. For example, where the DNN accelerator 2500 comprises hardware to perform each of the possible layer types the DNN accelerator 2500 may be able to process or implement a DNN comprising a first convolution layer, a first activation layer, a second convolution layer, a second activation layer, and a pooling layer by receiving the initial DNN input data and processing that input data according to the first convolution layer and the first activation layer in the first hardware pass and then outputting the output of the activation layer into memory, then in a second hardware pass receiving that data from memory as the input and processing that data according to the second convolution layer, the second activation layer, and the pooling layer to produce the output data for the DNN.

The example DNN accelerator 2500 of FIG. 25 comprises the convolution engine(s) 2202, accumulators 2204, accumulation buffer 2206, coefficient buffer 2208 and input buffer 2210, interleave engine 2212 and buffer 2214 of the system 2200 of FIG. 22. The example DNN accelerator 2500 of FIG. 25 also comprises an element-wise operations module 2506, an activation module 2508, a normalisation module 2510, a pooling module 2512, and an output module 2515. Each module or engine may be implemented by hardware logic and/or digital logic circuitry. Each module or engine implements or processes all or a portion of one or more types of layers. Specifically, together the convolution engine 2202, the accumulators 2204 and the accumulation buffer 2206 can implement or process all or a portion of a convolution layer, a fully connected layer or a convolution transpose layer. The activation module 2508 can process or implement an activation layer. The normalisation module 2510 can process or implement a normalisation layer. The pooling module 2512 can implement or process a pooling layer.

As described above, the input buffer is configured to receive the input data for the current hardware pass and provide it to a downstream module or engine for processing. The downstream module that receives the input data depends on the layers that are to be processed in the current hardware pass.

As described above the convolution engines 2202, the accumulators 2204 and the accumulation buffer 2206 are configured to perform a convolution operation on the received input data using the weights associated with that input data. The weights for a layer of the DNN may be stored in the coefficient buffer 2208 and the weights for a particular layer may be provided to the convolution engines 2202 when that particular layer is being processed by the convolution engines 2202. Where the DNN accelerator 2500 supports variable weight fixed point formats then the convolution engines 2202 may be configured to receive information indicating the format or formats of the weights of the current layer being processed to allow the convolution engines 2202 to properly interpret and process the received weights. The accumulation buffer 2206 outputs the results of the convolution to the element-wise operations module 2506 which may or may not operate on the result depending on whether an element-wise layer is to be processed during the current hardware pass.

The element-wise operations module 2506 is configured to receive either the input data for the current hardware pass (e.g. when the convolution engines 2202 do not process data in the current hardware pass) or the result output from the accumulation buffer 2206 (e.g. when the convolution engines process data in the current hardware pass). The element-wise operations module 2506 may either process the received input data or pass the received input data to another module (e.g. the activation module 2508 and/or or the normalisation module 2510) depending on whether an element-wise layer is processed in the current hardware pass and/or depending on whether an activation layer is to be processed prior to an element-wise layer. When the element-wise operations module 2506 is configured to process the received input data the element-wise operations module 2506 performs an element-wise operation on the received data (optionally with another data set (which may be obtained from external memory)). The element-wise operations module 2506 may be configured to perform any suitable element-wise operation such as, but not limited to add, multiply, maximum, and minimum. The result of the element-wise operation is then provided to either the activation module 2508 or the normalisation module 2510 depending on whether an activation layer is to be processed subsequent the element-wise layer or not.

The activation module 2508 is configured to receive one of the following as input data: the original input to the hardware pass (via the element-wise operations module 2506) (e.g. when the convolution engines 2202 do not process data in the current hardware pass); the accumulated data (via the element-wise operations module 2506) (e.g. when a convolution engines process data in the current hardware pass and either an element-wise layer is not processed in the current hardware pass or an element-wise layer is processed in the current hardware pass but it follows an activation layer). The activation module 2508 is configured to apply an activation function to the input data and provide the output data back to the element-wise operations module 2506 where it is forwarded to the normalisation module 2510 directly or after the element-wise operations module 2506 processes it. In some cases, the activation function that is applied to the data received by the activation module 2508 may vary per activation layer. In these cases, information specifying one or more properties of an activation function to be applied for each activation layer may be stored (e.g. in memory) and the relevant information for the activation layer processed in a particular hardware pass may be provided to the activation module 2508 during that hardware pass.

In some cases, the activation module 2508 may be configured to store, in entries of a lookup table, data representing the activation function. In these cases, the input data may be used to lookup one or more entries in the lookup table and output values representing the output of the activation function. For example, the activation module 2508 may be configured to calculate the output value by interpolating between two or more entries read from the lookup table.

In some examples, the activation module 2508 may be configured to operate as a Rectified Linear Unit (ReLU) by implementing a ReLU function. In a ReLU function, the output element $y_{i,j,k}$ is calculated by identifying a maximum value as set out in equation (5) wherein for x values less than 0, y=0:

$$y_{i,j,k}=f(x_{i,j,k})=\max\{0,x_{i,j,k}\} \quad (5)$$

In other examples, the activation module 2508 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in R$ are constants, the PReLU is configured to generate an output element $y_{i,j,k}$ as set out in equation (6):

$$y_{i,j,k}=f(x_{i,j,k};w_1,w_2,b_1,b_2)=\max\{(w_1 \ast x_{i,j,k}+b_1),(w_2 \ast x_{i,j,k}+b_2)\} \quad (6)$$

The normalisation module 2510 is configured to receive one of the following as input data: the original input data for the hardware pass (via the element-wise operations module 2506) (e.g. when the convolution engines 2202 do not process data in the current hardware pass and neither an element-wise layer nor an activation layer is processed in the current hardware pass); the accumulation output (via the element-wise operations module 2506) (e.g. when a convolution layer is processed in the current hardware pass and neither an element-wise layer nor an activation layer is processed in the current hardware pass); and the output data of the element-wise operations module and/or the activation module. The normalisation module 2510 then performs a normalisation function on the received input data to produce normalised data. In some cases, the normalisation module 2510 may be configured to perform a Local Response Normalisation (LRN) Function and/or a Local Contrast Normalisation (LCN) Function. However, it will be evident to a person of skill in the art that these are examples only and that the normalisation module 2510 may be configured to implement any suitable normalisation function or functions. Different normalisation layers may be configured to apply different normalisation functions.

The pooling module 2512 may receive the normalised data from the normalisation module 2510 or may receive the input data to the normalisation module 2510 via the normalisation module 2510. In some cases, data may be transferred between the normalisation module 2510 and the pooling module 2512 via an XBar 2518. The term "XBar" is used herein to refer to a simple hardware module that contains routing logic which connects multiple modules together in a dynamic fashion. In this example, the XBar may dynamically connect the normalisation module 2510, the pooling module 2512 and/or the interleave engine 2212 depending on which layers will be processed in the current hardware pass. Accordingly, the XBar may receive information each hardware pass indicating which modules/engines 2510, 2512, 2212 are to be connected.

The pooling module 2512 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The interleave engine 2212 is configured to operate in the manner described above. Specifically, the interleave engine receives a plurality of output/sub-output tensors and interleaves the output elements thereof to form a final output tensor. In this example the output/sub-output tensors are received from the accumulation buffer 2206 via the normalisation module 2510. In some cases, the data may be transferred between the normalisation module 2510 and the interleave engine 2212 via an XBar 2518.

The data generated by the last of the layers is provided to the output module 2515 where it may be converted to a desired output format for the current hardware pass.

The normalisation module 2510, the pooling module 2512, and the interleave engine 2212 may each have access to a shared buffer 2214 which can be used by these modules 2510, 2512 and 2212 to write data to and retrieve data from. For example, the shared buffer 2214 may be used by these modules/engines 2510, 2512, 2212 to rearrange the order of the received data or the generated data. For example, one or more of these modules/engines 2510, 2512, 2212 may be configured to write data to the shared buffer 2214 and read the same data out in a different order. In some cases, although each of the normalisation module 2510, the pooling module 2512 and the interleave engine 2212 have access to the shared buffer 2214, each of the normalisation module 2510, the pooling module 2512 and the interleave engine 2212 may be allotted a portion of the shared buffer 2214 which only they can access. In these cases, each of the normalisation module 2510, the pooling module 2512 and the interleave engine 2212 may only be able to read data out of the shared buffer 2214 that they have written into the shared buffer 2214.

As described above the modules of the DNN accelerator 2500 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the DNN accelerator 2500 may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution layer needs to be written out to memory before it can be used as an input to the second convolution layer. In each of these hardware passes only the modules, components or engines relevant to a convolution layer, such as the convolution engines 2202, accumulators 2204 and the accumulation buffer 2206, may be used or active.

Although the DNN accelerator 2500 of FIG. 25 illustrates a particular order in which the modules, engines etc. are arranged and thus how the processing of data flows through the DNN accelerator, it will be appreciated that this is an example only and that in other examples the modules, engines etc. may be arranged in a different manner. Furthermore, other DNN accelerators may support additional or alternative types of DNN layers and thus may comprise different modules, engines etc.

Figure 26:
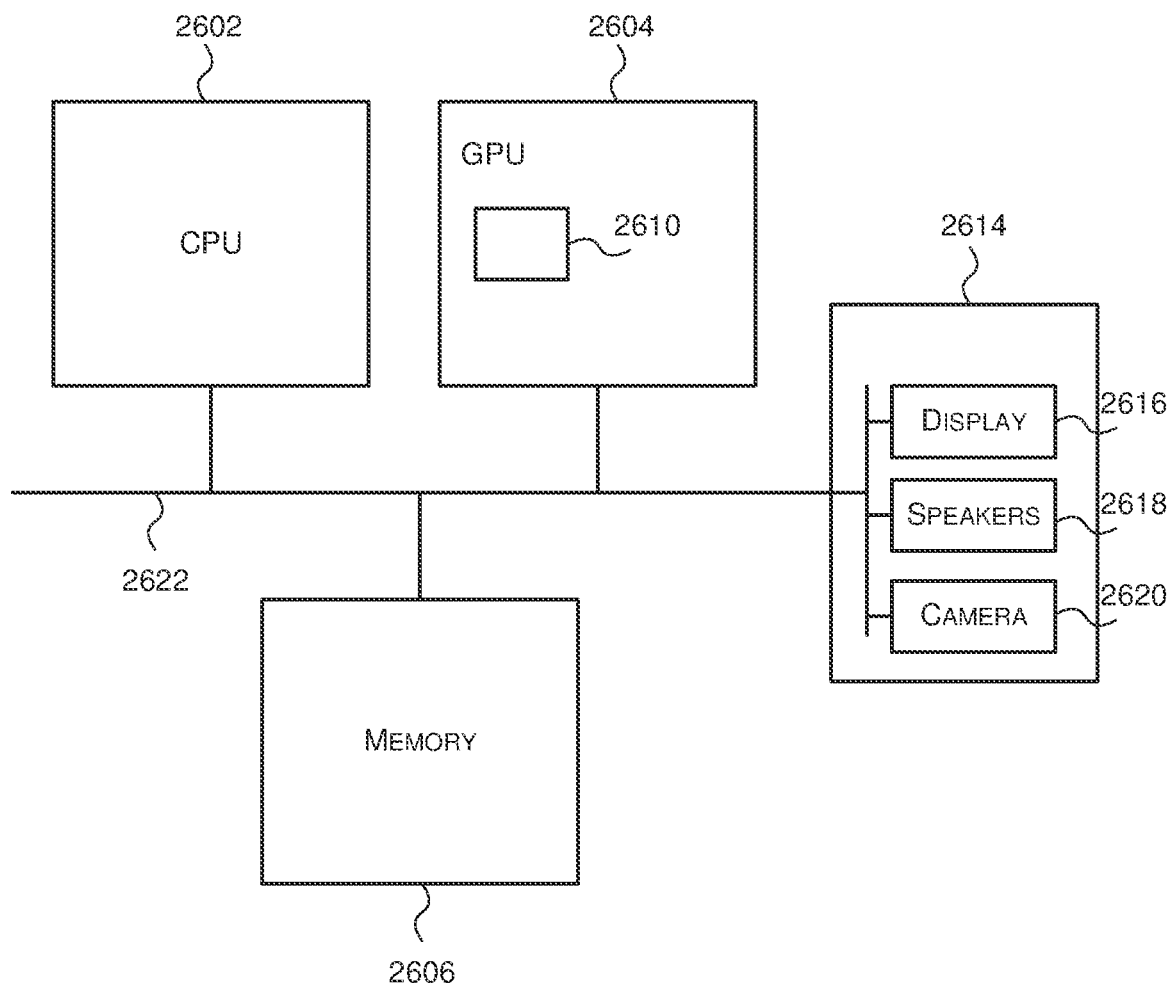
FIG. 26 is a block diagram of an example computer system in which the system for performing a convolution transpose as described herein may be implemented.

FIG. 26 shows a computer system in which the system 2200 for performing a convolution transpose described herein may be implemented. The computer system comprises a CPU 2602, a GPU 2604, a memory 2606 and other devices 2614, such as a display 2616, speakers 2618 and a camera 2620. A system 2610 for performing a convolution transpose (corresponding to system 2200 of FIG. 22) is implemented on the GPU 2604. In other examples, the system 2610 may be implemented on the CPU 2602. The components of the computer system can communicate with each other via a communications bus 2622.

The system 2200, convolution engine 2202, DNN accelerator 2500 of FIGS. 22, 23 and 25 are shown as comprising a number of functional blocks. This is schematic only and is not intended to define a strict division between different logic elements of such entities. Each functional block may be provided in any suitable manner. It is to be understood that intermediate values described herein as being formed by a particular functional block need not be physically generated by the system, engine or accelerator at any point and may merely represent logical values which conveniently describe the processing performed by the system, engine or accelerator between its input and output.

The systems 2200, convolution engines 2202 and DNN accelerators 2500 described herein may be embodied in hardware on an integrated circuit. The systems 2200 and DNN accelerators 2500 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the integrated circuit manufacturing system to manufacture a system (such as system 2200 of FIG. 22) configured to perform any of the methods described herein, or to manufacture a computing-based device (such as the comprising any apparatus described herein. An integrated circuit definition dataset may be, for example, an integrated circuit description.

Therefore, there may be provided a method of manufacturing, at an integrated circuit manufacturing system, a system for performing a convolution transpose as described herein. Furthermore, there may be provided an integrated circuit definition dataset that, when processed in an integrated circuit manufacturing system, causes the method of manufacturing a system for performing a convolution transpose to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a system for performing a convolution transpose will now be described with respect to FIG. 27.

Figure 27:
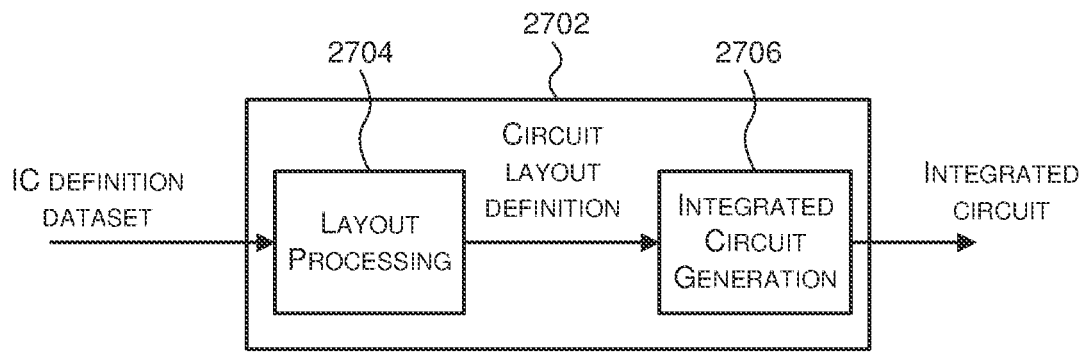
FIG. 27 is a block diagram of an example integrated circuit manufacturing system which may be used to generate an integrated circuit embodying the system for performing a convolution transpose as described herein.

FIG. 27 shows an example of an integrated circuit (IC) manufacturing system 2702 which is configured to manufacture a system for performing a convolution transpose as described in any of the examples herein. In particular, the IC manufacturing system 2702 comprises a layout processing system 2704 and an integrated circuit generation system 2706. The IC manufacturing system 2702 is configured to receive an IC definition dataset (e.g. defining a system for performing a convolution transpose as described in any of the examples herein), process the IC definition dataset, and generate an IC according to the IC definition dataset (e.g.

which embodies a system for performing a convolution transpose as described in any of the examples herein). The processing of the IC definition dataset configures the IC manufacturing system 2702 to manufacture an integrated circuit embodying a system for performing a convolution transpose as described in any of the examples herein.

The layout processing system 2704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2704 has determined the circuit layout it may output a circuit layout definition to the IC generation system 2706. A circuit layout definition may be, for example, a circuit layout description.

The IC generation system 2706 generates an IC according to the circuit layout definition, as is known in the art. For example, the IC generation system 2706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2706 may be in the form of computer-readable code which the IC generation system 2706 can use to form a suitable mask for use in generating an IC.

The different processes performed by the IC manufacturing system 2702 may be implemented all in one location, e.g. by one party. Alternatively, the IC manufacturing system 2702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a system for performing a convolution transpose without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 27 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 27, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A system to perform a convolution transpose operation between an input tensor comprising a plurality of input elements and a filter comprising a plurality of filter weights to enable a deep neural network to perform a signal processing task, the system comprising:
   hardware logic configured to:
      perform a direct convolution between the input tensor and each of a plurality of sub-filters to generate a plurality of sub-output tensors, each sub-output tensor of the plurality of sub-output tensors comprising a plurality of output elements, each sub-filter of the plurality of sub-filters comprising a subset of the plurality of filter weights, and
      interleave the output elements of the plurality of sub-output tensors to form a final output tensor for the convolution transpose operation;
   wherein interleaving the output elements of the plurality of sub-output tensors to form the final output tensor for the convolution transpose operation comprises storing the output elements of each of the plurality of sub-output tensors in a storage unit and reading the output elements of the plurality of sub-output tensors from the storage unit in a predetermined order to form the final output tensor.

2. The system of claim 1 wherein:
the input tensor is multi-dimensional;
the convolution transpose operation is performed in a first dimension of the input tensor at a first stride and a second dimension of the input tensor at a second stride; and
the plurality of sub-filters comprises q sub-filters, wherein q is equal to the product of the first stride and the second stride.

3. The system of claim 1, wherein the plurality of sub-filters comprise non-overlapping subsets of the plurality of filter weights.

4. The system of claim 1, wherein the filter weights of a sub-filter are in a reverse order in the sub-filter with respect to the filter.

5. The system of claim 1, wherein the convolution transpose operation is performed in a first dimension according to a first stride and the hardware logic is configured to interleave the output elements of the plurality of sub-output tensors to form the final output tensor for the convolution transpose operation by, for each row of the final output tensor, selecting output elements from a set of k sub-output tensors in a round-robin manner, wherein k is equal to the first stride.

6. The system of claim 5, wherein the convolution transpose operation is further performed in a second dimension according to a second stride and the hardware logic is further configured to interleave the output elements of the plurality of sub-output tensors to form the final output tensor for the convolution transpose operation by, for every $j^{th}$ row of the final output tensor, selecting output elements from a same set of k sub-output tensors, wherein j is equal to the second stride.

7. The system of claim 1, wherein the system is configured to perform the convolution transpose operation over a plurality of hardware passes of the system.

8. The system of claim 7, wherein the hardware logic is configured to generate a different subset of the plurality of sub-output tensors in each of the plurality of hardware passes.

9. The system of claim 8, wherein each subset of the plurality of sub-output tensors comprises sub-output tensors that comprise output elements in a same row of the final output tensor.

10. The system of claim 8, wherein in a first hardware pass of the system the hardware logic is configured to generate a first subset of the plurality of sub-output tensors from a first subset of the plurality of sub-filters and generate a first set of blocks of the final output tensor by interleaving the output elements of the first subset of the plurality of sub-output tensors; and in a second hardware pass of the system the hardware logic is configured to generate a second subset of the plurality of sub-output tensors from a second subset of the plurality of sub-filters and generate a second set of blocks of the final output tensor by interleaving the output elements of the second subset of the plurality of sub-output tensors.

11. The system of claim 10, wherein the hardware logic is further configured to write the first and second sets of blocks to memory such that that first and second sets of blocks together form at least a portion of the final output tensor.

12. The system of claim 7, wherein in each of the plurality of hardware passes of the system the hardware logic is configured to generate a portion of one or more of the plurality of sub-output tensors based on a portion of the plurality of input elements.

13. The system of claim 1, wherein the hardware logic comprises one or more convolution engines, one or more accumulators and an accumulation buffer, each accumulator is configurable to receive an output of one convolution engine and add the output to a previous convolution engine output stored in the accumulation buffer that relates to the same sub-filter; and wherein the interleaving is performed on the data in the accumulation buffer.

14. The system of claim 1, wherein the system is embodied in hardware on an integrated circuit.

15. A method of performing a convolution transpose operation between an input tensor comprising a plurality of input elements and a filter comprising a plurality of filter weights to enable a deep neural network to perform a signal processing task, the method comprising:
performing, using hardware logic, a direct convolution operation between the input tensor and each of a plurality of sub-filters to generate a plurality of sub-output tensors, each sub-output tensor of the plurality of sub-output tensors comprising a plurality of output elements, each sub-filter of the plurality of sub-filters comprising a subset of the plurality of filter weights; and
interleaving, using hardware logic, the output elements of the plurality of sub-output tensors to form a final output tensor for the convolution transpose operation;
wherein interleaving the output elements of the plurality of sub-output tensors to form the final output tensor for the convolution transpose operation comprises storing the output elements of each of the plurality of sub-output tensors in a storage unit and reading the output elements of the plurality of sub-output tensors from the storage unit in a predetermined order to form the final output tensor.

16. The method of claim 15, wherein the convolution transpose operation is performed in one or more dimensions according to a stride in that dimension, and the method further comprises generating the plurality of sub-filters by:
forming a base block of filter weights from an origin of the filter, the base block having dimensions equal to the stride in each of the one or more dimensions; and
forming each sub-filter by:
forming an initial sub-filter from the filter weights at the stride increments in each of the one or more dimensions starting from one of the filter weights in the base block; and
generating a reflected version of the formed initial sub-filter.

17. The method of claim 15, wherein the convolution transpose operation is performed in one or more dimensions according to a stride in that dimension, and the method further comprises generating the plurality of sub-filters by:
generating a reflected version of the filter;
forming a base block of filter weights from an origin of the reflected version of the filter, the base block having dimensions equal to the stride in each of the one or more dimensions; and
forming each sub-filter from the filter weights of the reflected version of the filter at the stride increments in each of the one or more dimensions starting from one of the filter weights in the base block.

18. A deep neural network hardware accelerator comprising the system as set forth in claim 1.

19. A non-transitory computer readable storage medium having stored thereon a computer readable dataset description of the system as set forth in claim 1 that, when processed in an integrated circuit manufacturing system, causes the integrated circuit manufacturing system to manufacture an integrated circuit embodying the system.

20. An integrated circuit manufacturing system comprising:
- a computer readable storage medium having stored thereon a computer readable description of the system as set forth in claim 1;
- a layout processing system configured to process the computer readable description so as to generate a circuit layout description of an integrated circuit embodying the system; and
- an integrated circuit generation system configured to manufacture the system according to the circuit layout description.

* * * * *